United States Patent
Inomoto et al.

(10) Patent No.: US 9,291,800 B2
(45) Date of Patent: Mar. 22, 2016

(54) LENS APPARATUS AND IMAGE PICKUP APPARATUS INCLUDING THE SAME

(71) Applicant: CANON KABUSHIKI KAISHA, Tokyo (JP)

(72) Inventors: Yu Inomoto, Saitama (JP); Yosuke Eguchi, Saitama (JP); Yotaro Sanjo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 14/224,267

(22) Filed: Mar. 25, 2014

(65) Prior Publication Data

US 2014/0293441 A1    Oct. 2, 2014

(30) Foreign Application Priority Data

Mar. 29, 2013   (JP) .................................. 2013-072744
Mar. 29, 2013   (JP) .................................. 2013-072745

(51) Int. Cl.
| | |
|---|---|
| H04N 5/232 | (2006.01) |
| H04N 5/235 | (2006.01) |
| G02B 13/04 | (2006.01) |
| G02B 27/00 | (2006.01) |
| G02B 13/18 | (2006.01) |
| G02B 13/16 | (2006.01) |
| G02B 13/22 | (2006.01) |

(52) U.S. Cl.
CPC ............... *G02B 13/04* (2013.01); *G02B 13/16* (2013.01); *G02B 13/18* (2013.01); *G02B 13/22* (2013.01); *G02B 27/005* (2013.01); *G02B 27/0081* (2013.01); *H04N 5/2355* (2013.01); *H04N 5/23296* (2013.01)

(58) Field of Classification Search
CPC ........ G02B 13/16; G02B 13/18; G02B 13/22; G02B 13/04; G02B 27/005; G02B 27/0081; H04N 5/23296; H04N 5/2355
See application file for complete search history.

(56) References Cited

U.S. PATENT DOCUMENTS

| | | | | |
|---|---|---|---|---|
| 7,725,020 | B2 * | 5/2010 | Uchida et al. | ................. 396/144 |
| 2007/0223105 | A1 | 9/2007 | Sensui | |
| 2009/0290860 | A1 | 11/2009 | Uchida et al. | |
| 2014/0293123 | A1 * | 10/2014 | Wakazono et al. | ........... 348/361 |

FOREIGN PATENT DOCUMENTS

| | | |
|---|---|---|
| CN | 101000402 A | 7/2007 |
| CN | 101042466 A | 9/2007 |
| CN | 101526667 A | 9/2009 |
| CN | 102289052 A | 12/2011 |
| JP | 2002-148537 A | 5/2002 |
| JP | 4186560 B2 | 11/2008 |
| JP | 2009-265171 A | 11/2009 |
| JP | 2011-081110 A | 4/2011 |
| JP | 2012-018422 A | 1/2012 |
| JP | 5045300 A | 10/2012 |

OTHER PUBLICATIONS

Chinese Office Action issued in corresponding application No. 201410112301.3 on Jan. 22, 2016.

* cited by examiner

*Primary Examiner* — David N Spector
(74) *Attorney, Agent, or Firm* — Carter, DeLuca, Farrell & Schmidt, LLP

(57) ABSTRACT

A lens apparatus includes, in order from an object side: a first lens unit; an aperture stop; and a positive second lens unit. The first lens unit includes, in order from the object side, a first negative lens, a second negative lens having at least one aspheric surface, and a positive lens. The second lens unit includes at least one negative lens and at least two positive lenses. The first and second negative lenses of the first lens unit are meniscus lenses having a surface convex toward the object side. The focal length of the optical system, the focal lengths of the first and second lens units, the mean values of Abbe constants of the positive lens and the negative lenses of the first lens unit, and the mean values of Abbe constants of the positive lenses and the negative lenses of the second lens unit are appropriately configured.

14 Claims, 17 Drawing Sheets

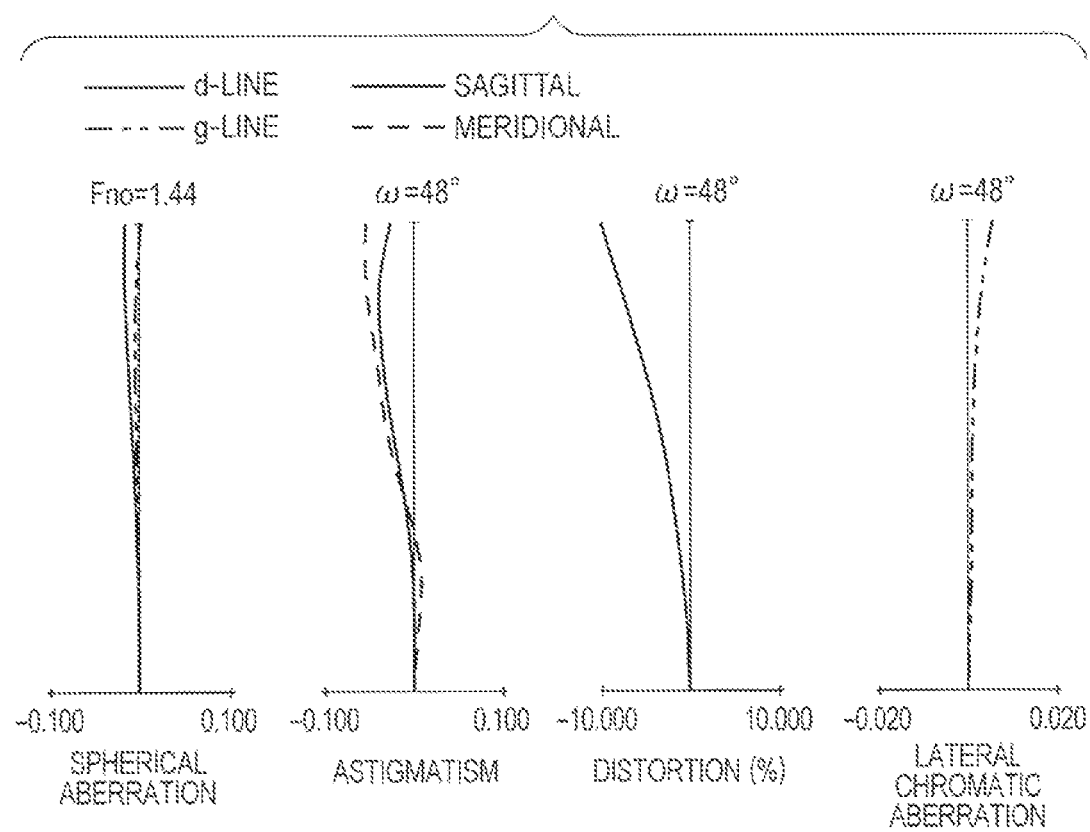
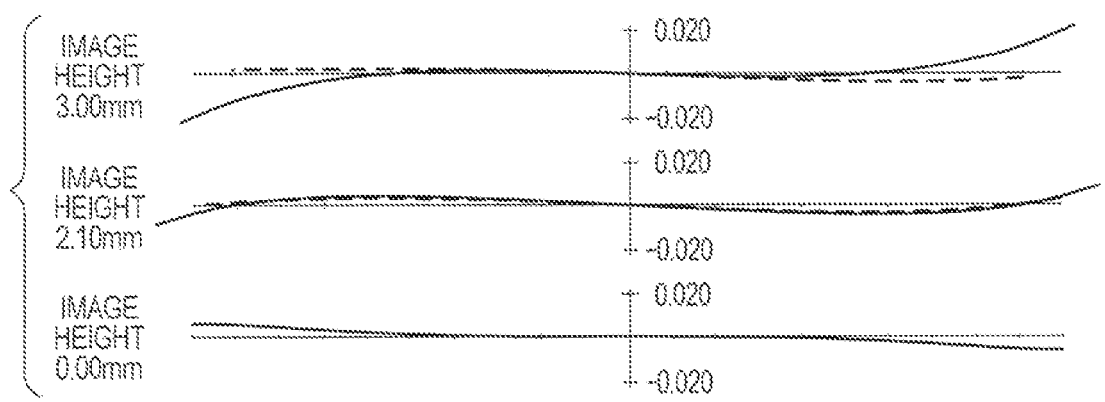

LENS APPARATUS AND IMAGE PICKUP APPARATUS INCLUDING THE SAME

BACKGROUND OF THE INVENTION

1. Field of the Invention

The present invention relates to a lens apparatus and an image pickup apparatus including the same, and particularly to, for instance, a single focal lens apparatus and a silver-halide film camera which are suitable for a monitoring camera, a vehicle-mounted camera, a video camera, a digital still camera or a silver-halide film camera and on which a concentric-shaped dome cover can be detachably mounted, and an image pickup apparatus including the same.

2. Description of the Related Art

Conventionally, single focal wide lenses that support increase in the number of pixels of an image pickup element and have high optical performance have been proposed as image pickup apparatuses, such as a monitoring camera and a vehicle-mounted camera. For instance, as disclosed in Japanese Patent No. 4186560 and Japanese Patent No. 5045300 and Japanese Patent Application Laid-Open No. 2012-18422, retro-focus single focal wide lenses including a negative or positive first lens unit, a stop and a positive second lens unit have been known.

In many monitoring cameras, a concentric-shaped dome cover is mounted on an image pickup system and used for protection and thermal insulation of the image pickup system. Since the dome cover has a refractive power, optical performance varies according to presence or absence of the dome cover. Japanese Patent Application Laid-Open No. 2011-81110 discloses a technique that corrects variation in optical performance according to presence or absence of a dome cover using a correction lens arranged between the dome cover and an image pickup system.

In recent years, image pickup apparatuses, such as a monitoring camera and a vehicle-mounted camera, are required to include a single focal lens having a wide angle of field.

Unfortunately, as with Japanese Patent No. 4186560 and Japanese Patent No. 5045300 and Japanese Patent Application Laid-Open No. 2012-18422, an image through a lens achieving a wide angle of field where a negative distortion is intentionally retained to be about −80% or stronger has a distorted periphery, which is unnatural.

As image processing techniques have advanced, image pickup apparatuses that electronically perform distortion correction to suppress distortion in an image have been proposed. Unfortunately, electronic enlargement of a compressed image degrades resolution at an angle of field at the periphery.

A design that has a wide angle of field and suppresses negative distortion requires reduction in focal length, which however increases the refractive power of each lens. Accordingly, it is difficult to correct various aberrations.

In recent years, as monitoring cameras, products are required that are image pickup apparatuses including dome covers for protection and thermal insulation of image pickup systems and achieving both high optical performance and reduction in size. Unfortunately, reduction in size of the dome cover increases the refractive power of the dome cover. Accordingly, variation in optical performance increases according to presence or absence of the dome cover. In particular, in a wide-angle lens, variation of a focus position at the periphery of an imaging range increases with respect to the center of the imaging range according to presence or absence of a dome cover. The periphery of the imaging range is thus out of focus with respect to the center of the imaging range. In Japanese Patent Application Laid-Open No. 2011-81110, a correction lens is arranged between a dome cover and an image pickup system to correct degradation of the optical performance. This arrangement increases the interval between the dome cover and the image pickup system. Particularly, in a wide-angle lens, a correction lens tends to be large in size, and the interval between the dome cover and the image pickup system increases, thereby in turn increasing the size of the image pickup apparatus.

SUMMARY OF THE INVENTION

A lens apparatus of the present invention includes an optical system that includes, in order from an object side to an image side: a first lens unit; an aperture stop; and a second lens unit having a positive refractive power, wherein the first lens unit includes, in order from the object side to the image side, a first negative lens, a second negative lens, and a positive lens, and the second lens unit includes at least one negative lens and at least two positive lenses, the first negative lens and the second negative lens of the first lens unit are meniscus lenses having a surface convex toward the object side, the second negative lens of the first lens unit has at least one aspheric surface, and $-0.25 < f/f1 < 0.20,$ $0.33 < f/f2 < 0.60,$ $0.20 < v1p/v1n < 0.70$ and $3.00 < v2p/v2n < 6.00$ are satisfied where f is a focal length of the optical system, f1 and f2 are focal lengths of the first lens unit and second lens unit, respectively, v1p and v1n are mean values of Abbe constants of the positive lens and the negative lenses of the first lens unit, respectively, and v2p and v2n are mean values of Abbe constants of the positive lenses and the negative lenses of the second lens unit, respectively.

A lens apparatus of another aspect of the present invention includes: an optical system that includes, in order from an object side to an image side, a detachable concentric-shaped dome cover, a first lens unit; an aperture stop, and a second lens unit having a positive refractive power; and a unit that changes an air interval on an optical axis between the first lens unit and the second lens unit, wherein $0.02 < Ld/D12 < 1.00,$ $-0.0060 < f/fd < -0.0009$ and $-0.25 < f/f1 < 0.20$ are satisfied where Ld is an air interval on the optical axis of an image-side surface of the dome cover and an object-side surface of the first lens unit in a case where the dome cover is mounted, D12 is a thickness on the optical axis from the object-side surface of the first lens unit to an image-side surface of the second lens unit in the case where the dome cover is mounted, f is a focal length of the optical system, fd is a focal length of the dome cover, and f1 is a focal length of the first lens unit.

The present invention provides a single focal lens apparatus that supports an image pickup element having a wide angle of field, low distortion, supports an image pickup element with high resolution and has high optical performance, and an image pickup apparatus including the same.

The present invention can also provide a small lens apparatus that suppresses variation in focus position at the periphery of an imaging range with respect to the center of the imaging range according to presence or absence of a dome cover and has high optical performance, and an image pickup apparatus including the same.

Further features of the present invention will become apparent from the following description of exemplary embodiments with reference to the attached drawings.

BRIEF DESCRIPTION OF THE DRAWINGS

FIG. 6A is a longitudinal aberration diagram of the lens apparatus of Example 3 at an object distance of 1 m.

FIG. 6B is a lateral aberration diagram of the lens apparatus of Example 3 at an object distance of 1 m.

DESCRIPTION OF THE EMBODIMENTS

Preferred embodiments of the present invention will now be described in detail in accordance with the accompanying drawings.

First Embodiment

A lens apparatus according to a first embodiment of the present invention is hereinafter described in detail with reference to the accompanying drawings.

Figure 1:
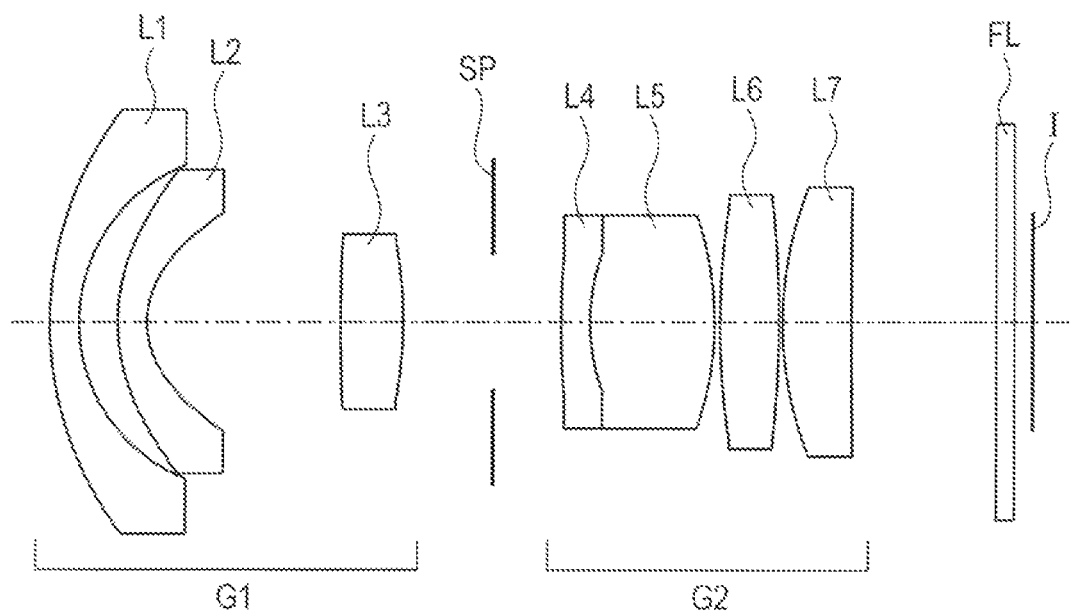
FIG. 1 is a lens sectional diagram of a lens apparatus of Example 1.

FIG. 1 is a lens sectional diagram of the lens apparatus of Example 1 (Numerical Example 1) of the present invention. In FIG. 1, the lens apparatus of Example 1 includes, in order from an object side to an image side: a first lens unit G1, an aperture stop SP; and a second lens unit G2 having a positive refractive power. A parallel plate FL illustrated in FIG. 1 corresponds to a low-pass filter or an IR cut filter. An image plane I corresponds to an image plane, such as a solid image pickup element (photoelectric conversion element) that receives subject light from an image pickup lens and photoelectrically converts the light. The foregoing configuration is completely identical to the configuration of each example.

Figure 2A:
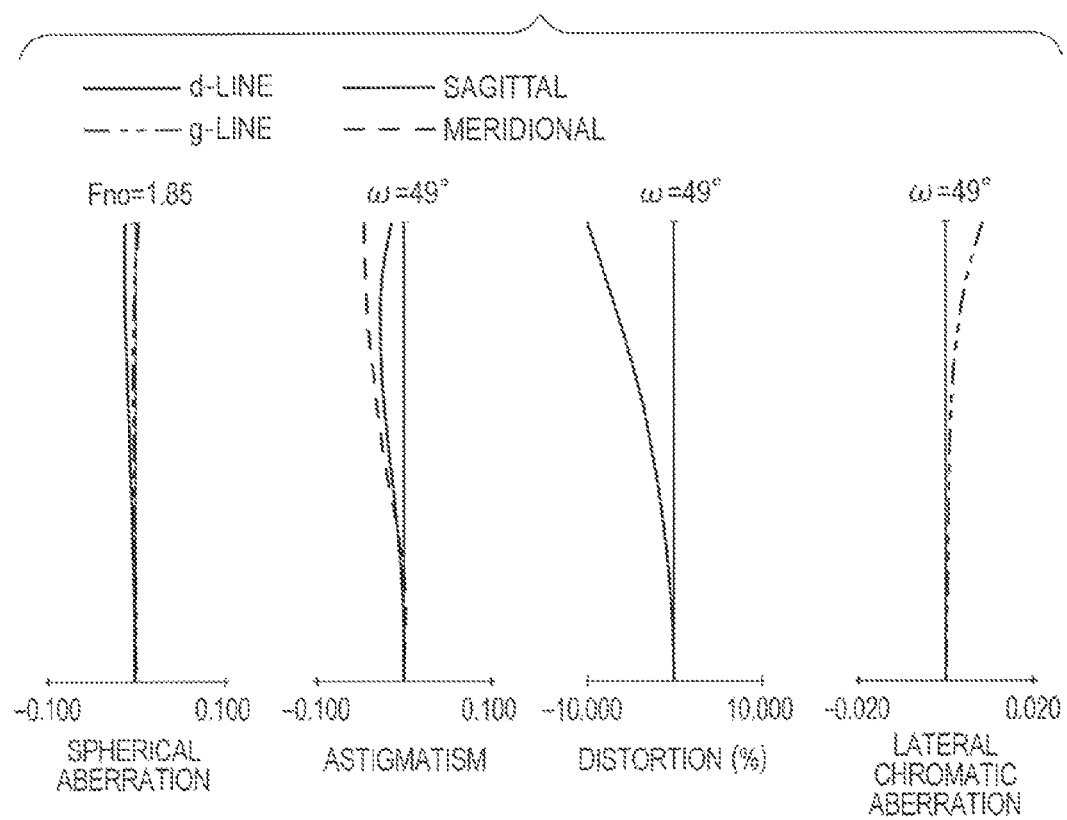
FIG. 2A is a longitudinal aberration diagram of the lens apparatus of Example 1 at an object distance of 1 m.
Figure 2B:
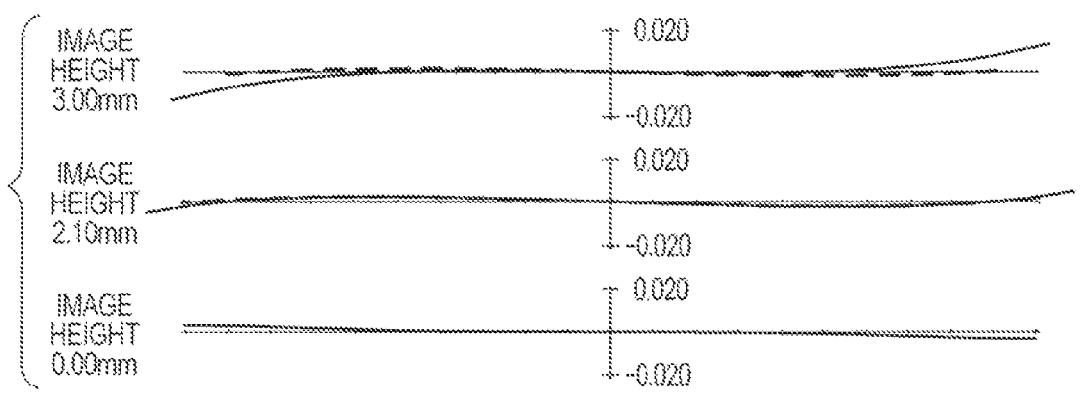
FIG. 2B is a lateral aberration diagram of the lens apparatus of Example 1 at an object distance of 1 m.

FIG. 2A is a longitudinal aberration diagram of Example 1 at an object distance of 1 m. The unit is represented by millimeters (only distortion is represented by percent). In the longitudinal aberration diagram, spherical aberration is represented for d-line (solid line) and g-line (chain double-dashed line). Astigmatism is represented on a sagittal image plane (solid line) and a meridional image plane (broken line) for d-line. The lateral chromatic aberration is represented for g-line (chain double-dashed line). An f-number Fno and an imaging half angle of field ω are also represented. In the longitudinal aberration diagram, spherical aberration is represented in a scale of 0.1 mm, astigmatism is represented in a scale of 0.1 mm, distortion is represented in a scale of 10%, and lateral chromatic aberration is represented in a scale of 0.02 mm. FIG. 2B is a lateral aberration diagram of Example 1 at an object distance of 1 m, and illustrates sagittal ray aberration (solid line) and meridional ray aberration (broken line) for d-line in a scale of 0.02 mm. The representation and the scale of the aberration diagram are analogous to the representation and the scale of each embodiment.

Lens apparatuses of Examples 1 to 5 of the present invention include, in order from an object side to an image side: a first lens unit; an aperture stop; and a second lens unit having a positive refractive power. The first lens unit includes, in order from the object side to the image side: a first negative lens; a second negative lens; and a positive lens. The second lens unit includes at least one negative lens, and at least two positive lenses. Each of the negative lenses of the first lens unit is a meniscus lens having a surface convex toward an object side. At least one of the surfaces of the second negative lens of the first lens unit is an aspheric surface. The focal length of the entire system is defined as f. The first lens unit and the second lens unit have focal lengths f1 and f2, respectively. The mean values of Abbe constants of the positive lens and the negative lenses of the first lens unit are defined as $v1p$ and $v1n$, respectively. The mean values of Abbe constants of the positive lenses and the negative lens of the second lenses unit are defined as $v2p$ and $v2n$, respectively. The following conditions $$-0.25 < f/f1 < 0.20 \tag{1}$$

$$0.33 < f/f2 < 0.60 \tag{2}$$

$$0.20 < \nu 1p/\nu 1n < 0.70 \tag{3}$$

$$3.00 < \nu 2p/\nu 2n < 6.00 \tag{4}$$

are satisfied.

The lens apparatuses of Examples 1 to 5 have a retro-focus configuration suitable to achieve a wide angle of field sufficient for monitoring usage. The first lens unit is favorably includes three lenses that are a first negative lens, a second negative lens and a positive lens. The second lens unit as an imaging lens unit favorably includes at least two positive lenses and at least one negative lens for correcting chromatic aberration.

According to the aberration theory, distortion is proportional to the height h of a paraxial axial ray from the optical axis, and also proportional to a height hbar cubed, the height hbar being of the paraxial off-axial principal ray from the optical axis. The lens apparatuses of the present invention have a wide angle of field. Accordingly, an off-axial incident beam from an object has a large incident angle. It is thus important to suppress negative distortion occurring at the first negative lens that is farthest from the stop and has the maximum value of the height hbar and at the second negative lens. Accordingly, the first negative lens and the second negative lens are favorably meniscus lenses that have a surface convex toward an object side and shapes suppressing a refraction angle of an off-axis ray on each surface.

Field curvature and astigmatism are proportional to the height h squared, the height h being of a paraxial axial ray from the optical axis, and also proportional to the height hbar squared, the height hbar being of a paraxial off-axial principal ray from the optical axis. In the lens apparatus of the present invention, an aspheric surface is favorably applied to the second negative lens, in which the height hbar is not too small and the height h is larger than the height of the first negative lens, to effectively correct field curvature and astigmatism in addition to suppression of negative distortion.

Furthermore, in Examples 1 to 5, to effectively correct field curvature and astigmatism, both the surfaces of the second negative lens are favorably aspheric.

A conditional expression (1) defines a ratio between the focal length f of the entire system and the focal length f1 of the first lens unit. Likewise, a conditional expression (2) defines a ratio between the focal length f of the entire system and the focal length f2 of the second lens unit. If the upper limit of the conditional expression (1) is exceeded, the convergence degree of a light flux incident on the second lens unit becomes too large and it thus becomes difficult to secure a sufficient back focus. If the lower limit of the conditional expression (1) is fallen short, the divergence degree of the light flux incident on the second lens unit becomes too large and it thus becomes difficult to correct various aberrations.

If the upper limit of the conditional expression (2) is exceeded, the refractive power of the second lens unit becomes too strong and it thus becomes difficult to correct various aberrations. If the lower limit of the conditional expression (2) is fallen short, the refractive power becomes too weak and it thus becomes difficult to achieve an angle of field sufficiently wide for monitoring usage. The conditional expressions (1) and (2) are further favorably configured as follows, $$-0.19 < f/f1 < 0.12 \text{ and} \tag{1a}$$

$$0.35 < f/f2 < 0.47. \tag{2a}$$

The conditional expression (3) defines the ratio between the mean values $\nu 1p$ and $\nu 1n$ of Abbe constants of the positive lens and the negative lenses of the first lens unit. Likewise, the conditional expression (4) defines the ratio between the mean values $\nu 2p$ and $\nu 2n$ of Abbe constants of the positive lenses and the negative lenses of the second lens unit. The lens apparatus of the present invention favorably corrects negative distortion. Accordingly, for achievement of a wide angle of field, the apparatus is required to have a short focus configuration. Thus, the refractive power of the second lens unit, which principally has an important role as an imaging lens unit, increases. Accordingly, the refractive power of each lens in the second lens unit also increases. Therefore, the amount of occurrence of various aberrations tends to increase. For reduction in the refractive power of each lens in the second lens unit having a positive refractive power, according to the following linear achromatic conditional expression, $$\phi p/\nu p + \phi n/\nu n = 0$$

(where $\phi p$ and $\phi n$ are the refractive powers of the positive lens and the negative lens, respectively, and $\nu p$ and $\nu n$ are Abbe constants of the positive lens and the negative lens, respectively), the ratio $\nu p/\nu n$ between Abbe constants of the positive lens and the negative lens is favorably configured as large as possible.

Meanwhile, if the Abbe constant ratio of the second lens unit is configured to be large, axial chromatic aberration of the second lens unit is excessively corrected. Accordingly, the Abbe constant ratio of the first lens unit is favorably configured to be within a range that appropriately balances the excessively corrected axial chromatic aberration.

If the upper limit of the conditional expression (3) is exceeded, axial chromatic aberration is too excessively corrected or it becomes difficult to achieve compatibility with correction of lateral chromatic aberration. If the lower limit of the conditional expression (3) is fallen short, axial chromatic aberration is too insufficiently corrected or it becomes difficult to achieve compatibility with correction of lateral chromatic aberration. If the upper limit of the conditional expression (4) is exceeded, axial chromatic aberration is too excessively corrected. If the lower limit of the conditional expression (4) is fallen short, the refractive power of each lens of the second lens unit becomes too strong to increase various aberrations and it thus becomes difficult to achieve high optical performance. The conditional expressions (3) and (4) are further favorably configured as follows, $$0.28 < \nu 1p/\nu 1n < 0.57 \text{ and} \tag{3a}$$

$$3.20 < \nu 2p/\nu 2n < 4.80. \tag{4a}$$

The half angle of field of an incident ray at the maximum image height Y is defined as $\omega$. The lens apparatuses of Examples 1 to 5 of the present invention satisfy the following condition.

$$0.7 < Y/\{f \times \tan(\omega)\} < 1.0 \tag{5}$$

An expression of calculating an ideal image height is represented as follows, $$Y = f \times \tan(\omega).$$

The image height and the tangent of the angle of field are proportional to each other. However, effects of distortion cause non-linearity. The lens apparatus of the present invention suppresses the negative distortion to be small to about −10%. Accordingly, the conditional expression (5) has a value close to 1.0, which means a proportional relationship.

If the upper limit of the conditional expression (5) is exceeded, it becomes difficult to correct off-axial aberration, such as halo and coma and is thus impossible to achieve high optical performance. If the lower limit of the conditional expression (5) is fallen short, distortion cannot sufficiently be suppressed.

The conditional expression (5) is further favorably configured as follows, $$0.85 < Y/\{f \times \tan(\omega)\} < 0.95. \tag{5a}$$

Image pickup apparatuses, such as a monitoring camera and a vehicle-mounted camera, are required to include a deep focus lens with no focusing mechanism to achieve high reliability, simplification of mechanism, and reduction in size, weight and cost. In the deep focus lens, a distance range from infinity to the minimum object distance is within the range of depth of field. The permissible circle of confusion is defined as ϵ. According to the following expression, $$sh = f^2/(\epsilon \times Fno),$$

the minimum object distance is sh/2, which is half of the hyperfocal distance sh. Accordingly, for imaging in focus over a wider distance range, a small hyperfocal distance sh is more favorable. However, a lens achieving a wide angle of field through large negative distortion has a relatively long focal length even with the same angle of field. Accordingly, the hyperfocal distance becomes long, and operation as a deep focus lens becomes difficult. Furthermore, it is important to adopt a bright lens with a small f-number for dark place imaging for monitoring usage. However, if the f-number is configured to be small in the deep focus lens, the hyperfocal distance increases and operation as a deep focus lens becomes difficult. Thus, for operation as a deep focus lens for monitoring usage, the focal length and the f-number are required to be appropriately configured. To address these problems, the lens apparatus according to the present invention satisfies the following condition, $$0.50 < f^2/(Y \times Fno) < 2.50 \text{(unit mm)} \tag{6}$$

where Fno is an f-number at infinity.

At the foregoing hyperfocal distance sh, ϵ is proportional to the pixel pitch p in a diagonal direction of an image pickup element I. Thus, a relationship of ϵ∝p holds. The pixel pitch p can be represented as p=2×Y/n using the number of pixels n in the diagonal direction of the image pickup element and the maximum image height Y. Accordingly, representation of the hyperfocal distance sh can be replaced with representation of f²/(Y×Fno). That is, the conditional expression (6) defines the hyperfocal distance, which is the minimum object distance. If the upper limit of the conditional expression (6) is exceeded, the minimum object distance increases. Accordingly, operation as a deep focus lens becomes difficult, or it becomes difficult to achieve an angle of field sufficient for monitoring usage. In contrast, if the lower limit of the conditional expression (6) is fallen short, it becomes difficult to maintain sufficient brightness for monitoring usage, or the refractive power of the lens becomes strong and it thus becomes difficult to achieve low distortion and high performance. It is further favorable to configure the conditional expression (6) as follows, $$0.70 < f^2/(Y \times Fno) < 2.10. \text{(unit mm)} \tag{6a}$$

The refractive index of the positive lens of the first lens unit for d-line is defined as nlp. The lens apparatuses of Examples 1 to 5 favorably satisfy the following conditional expression, $$1.90 < n1p < 2.30. \tag{7}$$

Occurrence of negative distortion in the first negative lens and the second negative lens is suppressed while positive distortion is caused in the positive lens of the first lens unit. Accordingly, reduction in negative distortion is achieved more effectively. For generating positive distortion, an off-axial ray is required to be largely refracted. However, the refraction causes high-order halo and coma at a peripheral image height. For suppressing such high-order aberrations, it is effective to strengthen the refractive index nip and weaken the refractive power of the positive lens. If the upper limit of the conditional expression (7) is exceeded, the Abbe constant becomes too small with a lens material in existence. Accordingly, correction of axial chromatic aberration becomes insufficient, and compatibility with correction of lateral chromatic aberration becomes difficult. If the lower limit of the conditional expression (7) is fallen short, the refractive power of the positive lens increases, and high-order halo and coma aberrations increase. It thus becomes difficult to achieve favorable optical performance. The conditional expression (7) is more favorably configured as follows, $$1.90 < n1p < 2.15. \tag{7a}$$

In the lens apparatuses of Embodiments 1 to 5 of the present invention, the second lens unit includes a cemented lens including a negative lens and a positive lens. The Abbe constants of the negative lens and the positive lens of the cemented lens are defined as vcn and vcp, respectively. The following conditional expression is favorably satisfied.

$$3.00 < vcp/vcn < 6.00 \tag{8}$$

Arrangement of the cemented lens in the second lens unit can more effectively correct chromatic aberration. Based on a reason analogous to the reason for describing the conditional expression (4), the configuration of a large Abbe constant ratio between the negative lens and the positive lens of the cemented lens, which largely contributes to chromatic aberration, can further effectively reduce the refractive power of each of the lenses of the second lens unit. If the upper limit of the conditional expression (8) is exceeded, the axial chromatic aberration is too excessively corrected. If the lower limit of the conditional expression (8) is fallen short, the refractive power of each of the lenses of the second lens unit becomes too large and various aberrations increase. Accordingly, it becomes difficult to achieve high optical performance. The conditional expression (8) is further favorably configured as follows, $$3.70 < vcp/vcn < 5.50. \tag{8a}$$

In the lens apparatuses of Examples 1 to 5 of the present invention, the second lens unit includes a cemented lens including a negative lens and a positive lens. The refractive indices of the negative lens and the positive lens of the cemented lens are defined as ncn and ncp. The following conditional expression is favorably satisfied.

$$0.30 < ncn - ncp < 0.60 \tag{9}$$

The cemented lens has a configuration that effectively corrects chromatic aberration. Furthermore, a configuration with a large refractive index difference of the positive lens and the negative lens configuring the cemented lens in the second lens unit can increase the refractive power on the cemented surface for a reference wavelength (d-line), and correct not only chromatic aberration but also spherical aberration and coma aberration. If the upper limit of the conditional expression (9) is exceeded, the Abbe constant ratio of the cemented lens becomes too high with a lens material in existence, and the axial chromatic aberration is excessively corrected. If the lower limit of the conditional expression (9) is fallen short, the refractive power of the cemented surface becomes too small, and various aberrations increase. Accordingly, it becomes difficult to achieve high optical performance. The conditional expression (9) is more favorably configured as follows, $$0.36 < ncn - ncp < 0.55. \tag{9a}$$

The lens apparatuses of Examples 1 to 5 of the present invention favorably have any of the following lens configurations (A) and (B).

(A) The second lens unit includes, in order from an object side to an image side: a cemented lens including a negative lens and a positive lens; a positive lens; and a positive lens.

In an image pickup apparatus including a solid image pickup element, if the angle of a ray incident on the image pickup element is too large, a peripheral light intensity decreases and shading occurs. Accordingly, the exit pupil of a lens is required to be apart from the image plane as much as possible to achieve a substantially telecentric configuration.

To achieve this configuration, it is effective to cause the second lens unit, which is disposed after (in other word, on the image side of) the aperture stop, to have a retro-focus configuration as with the foregoing lens configuration.

(B) The second lens unit includes, in order from an object side to an image side: a cemented lens including a positive lens and a negative lens; and a positive lens. The positive lens nearest to the image has an aspheric surface.

Another lens configuration may be adopted. According to this configuration, the second lens unit includes three lenses, and an aspheric surface is arranged on the positive lens disposed on the most image side. This configuration can also achieve a wide angle and off-axial aberration correction in a compatible manner.

Next, the characteristics of lens configurations of Examples 1 to 5 are described.

Example 1

Hereinafter, referring to FIG. 1, a specific lens configuration of a first example of the present invention is described.

FIG. 1 is a lens sectional diagram of a lens apparatus of Example 1 (Numerical Example 1) of the present invention. The lens apparatus of Example 1 includes, in order from an object side to an image side: a first lens unit G1; an aperture stop SP; and a second lens unit G2 having a positive refractive power. The first lens unit G1 includes, in order from the object side to the image side: a negative meniscus lens L1 convex toward the object side; a negative meniscus lens L2 that is convex toward the object side and has aspheric surfaces on both sides; and a positive lens L3. The second lens unit G2 includes, in order from the object side to the image side: a cemented lens including a negative lens L4 and a positive lens L5; a positive lens L6; and a positive lens L7. A parallel plate FL corresponds to any of a low-pass filter and an IR cut filter. An image plane I corresponds to an image pickup plane of a solid image pickup element (photoelectric conversion element) that receives subject light from the lens and photoelectrically converts the light.

Table 1 illustrates correspondence values of Example 1 pertaining to the conditional expressions (1) to (9). Example 1 satisfies all the conditional expressions, and achieves a lens apparatus that has a small f-number, a wide angle of field, low distortion, supports an image pickup element having high resolution, and achieves high optical performance.

Example 2

Figure 3:
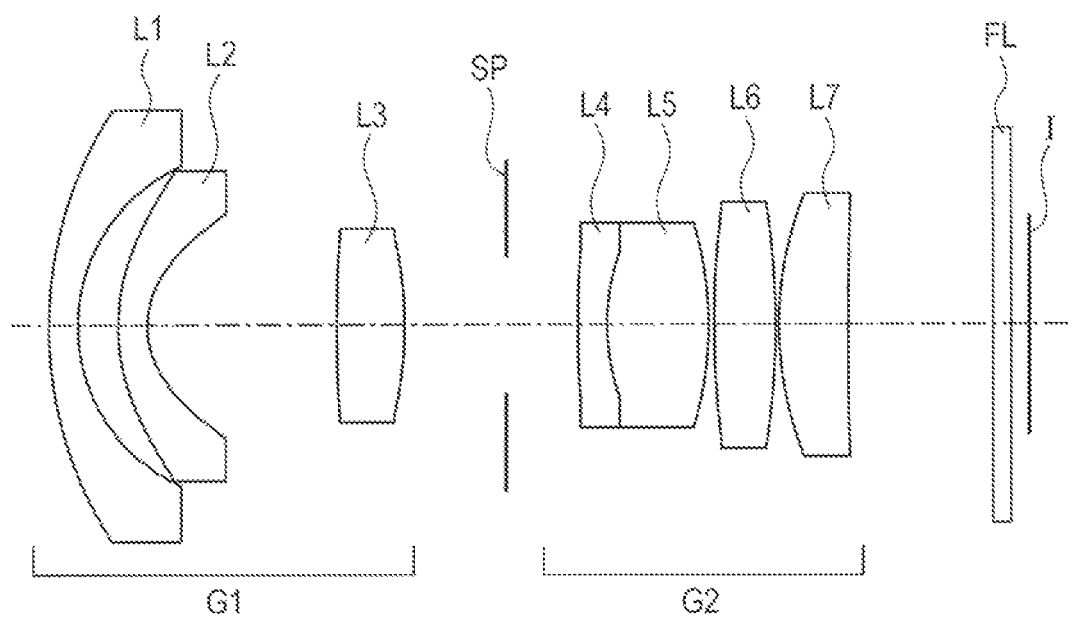
FIG. 3 is a lens sectional diagram of a lens apparatus of Example 2.

FIG. 3 is a lens sectional diagram of a lens apparatus of Example 2 (Numerical Example 2) of the present invention. The lens configuration is completely identical to the configuration of Example 1.

Figure 4A:
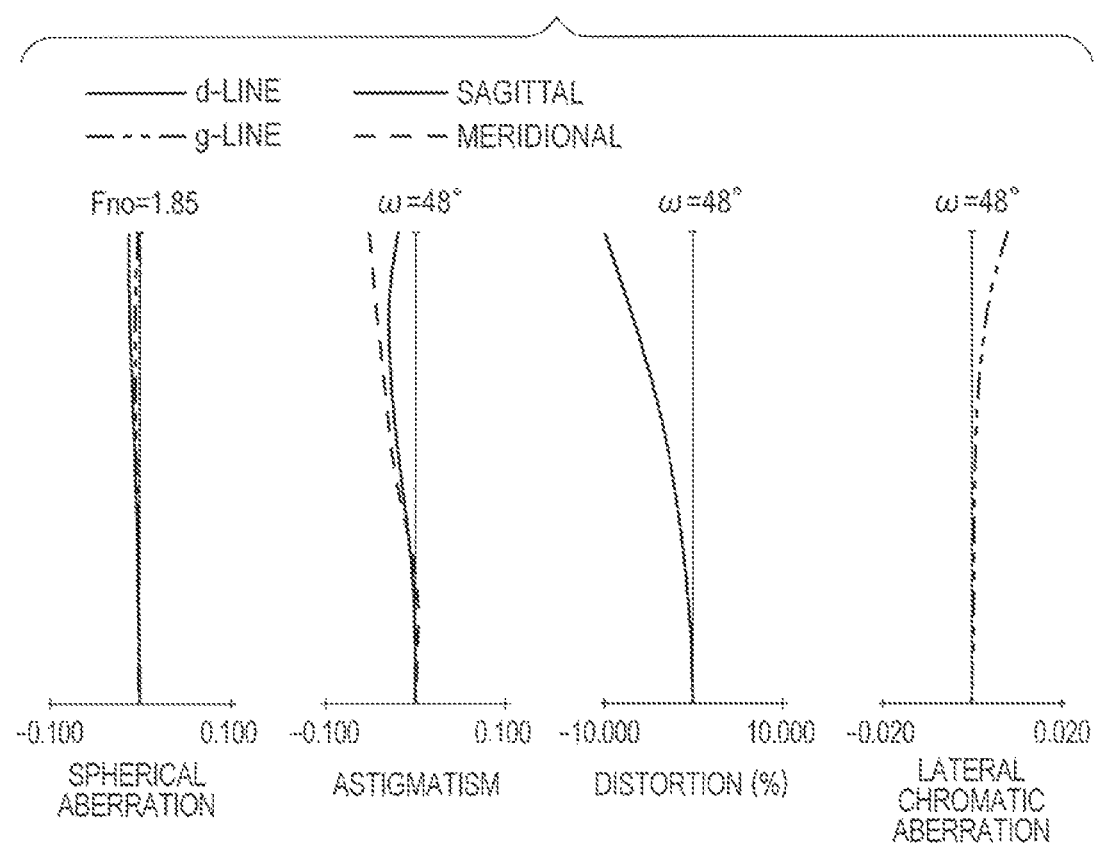
FIG. 4A is a longitudinal aberration diagram of the lens apparatus of Example 2 at an object distance of 1 m.
Figure 4B:
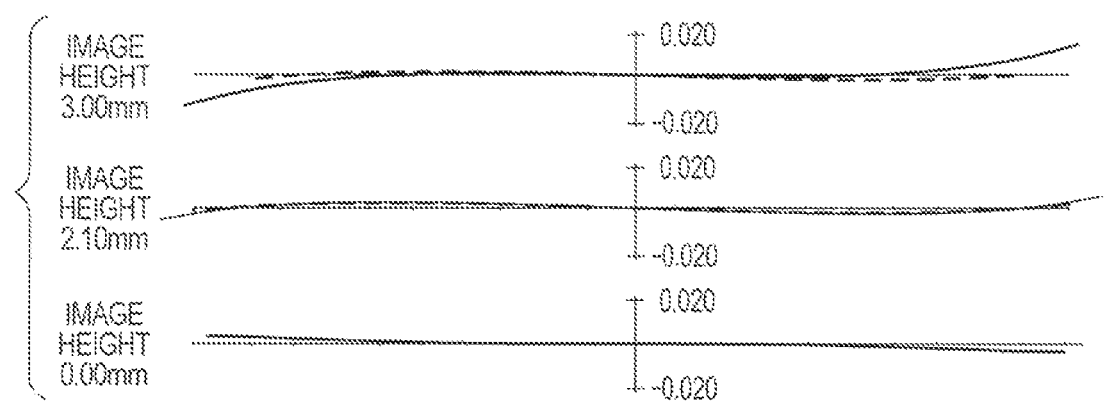
FIG. 4B is a lateral aberration diagram of the lens apparatus of Example 2 at an object distance of 1 m.

Table 1 illustrates correspondence values of Example 2 pertaining to the conditional expressions (1) to (9). Example 2 satisfies all the conditional expressions, and achieves a lens apparatus that has a small f-number, a wide angle of field, low distortion, supports an image pickup element having high resolution, and achieves high optical performance (FIGS. 4A and 4B).

Example 3

Figure 5:
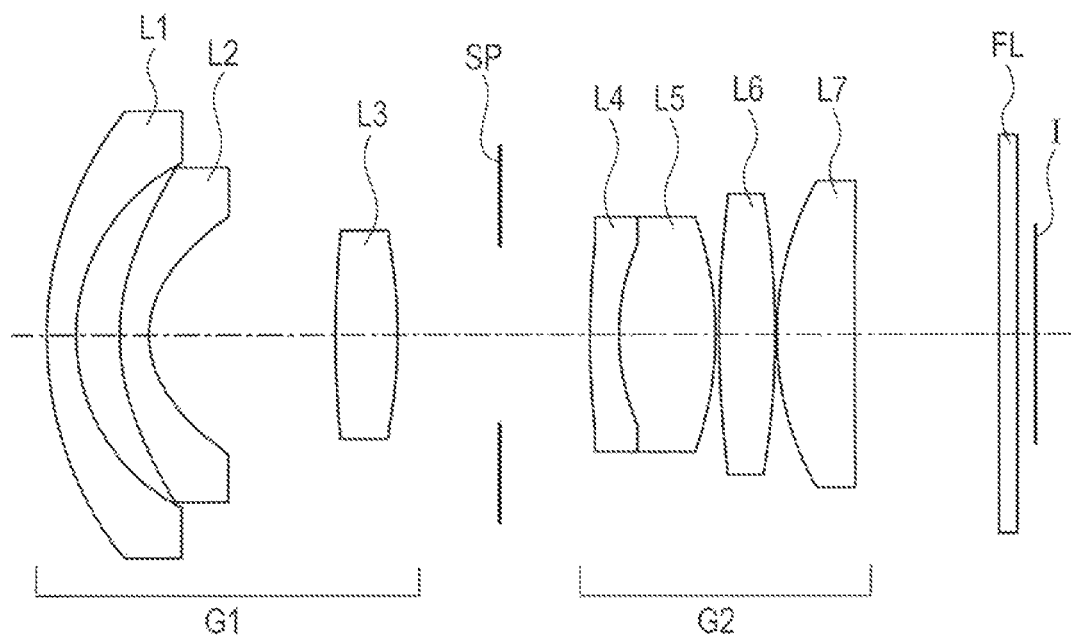
FIG. 5 is a lens sectional diagram of a lens apparatus of Example 3.

FIG. 5 is a lens sectional diagram of a lens apparatus of Example 3 (Numerical Example 3) of the present invention. The lens configuration is completely identical to the configuration of Example 1.

Table 1 illustrates correspondence values of Example 3 pertaining to the conditional expressions (1) to (9). Example 3 satisfies all the conditional expressions, and achieves a lens apparatus that has a small f-number, a wide angle of field, low distortion, supports an image pickup element having high resolution, and achieves high optical performance (FIGS. 6A and 6B).

Example 4

Figure 7:
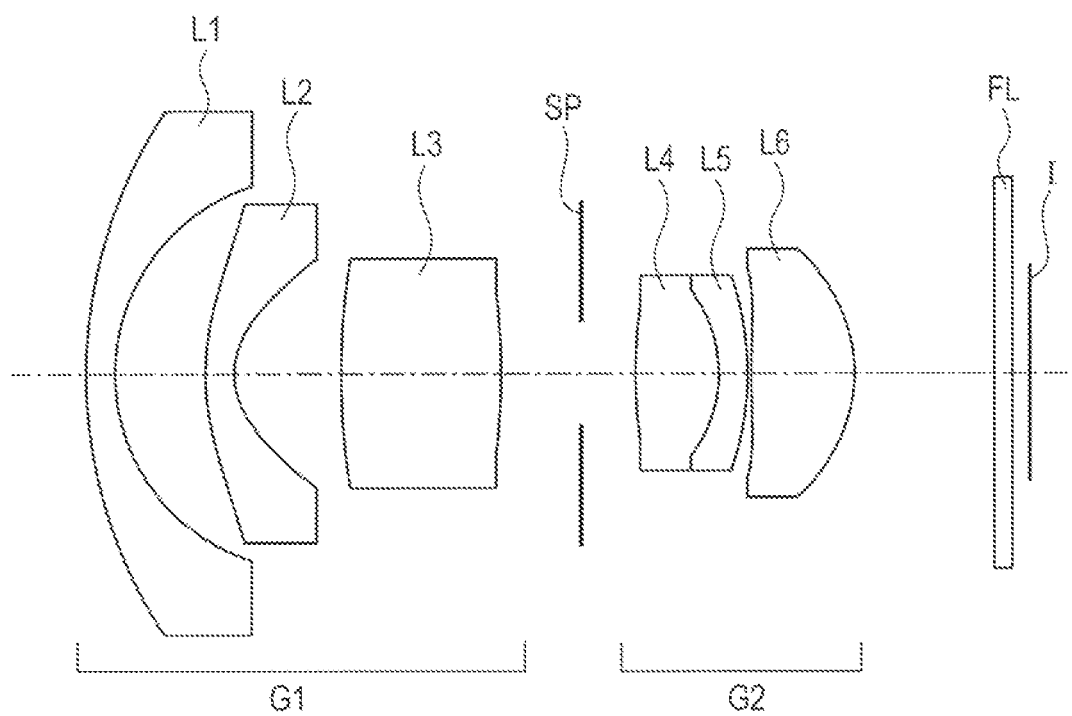
FIG. 7 is a lens sectional diagram of a lens apparatus of Example 4.

FIG. 7 is a lens sectional diagram of a lens apparatus of Example 4 (Numerical Example 4) of the present invention. The lens apparatus of Example 4 includes, in order from an object side to an image side: a first lens unit G1; an aperture stop SP; and a second lens unit G2 having a positive refractive power. The first lens unit G1 includes: a negative meniscus lens L1 convex toward the object side; a negative meniscus lens L2 that is convex toward the object side and has both aspheric surfaces; and a positive lens L3. The second lens unit G2 includes, in order from the object side to the image side: a cemented lens including a positive lens L4 and a negative lens L5; and a positive lens L6 having both aspheric surfaces. A parallel plate FL corresponds to any of a low-pass filter and an IR cut filter. An image plane I corresponds to an image pickup plane of a solid image pickup element (photoelectric conversion element) that receives subject light from the lens and photoelectrically converts the light.

Figure 8A:
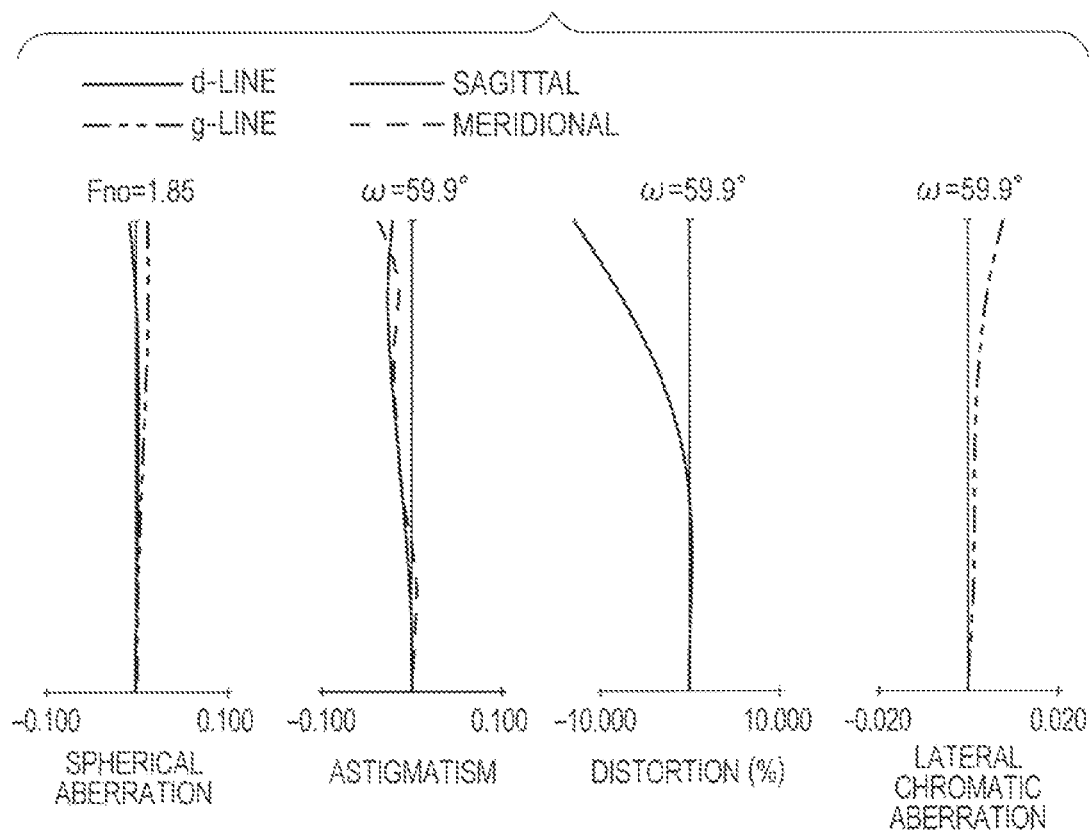
FIG. 8A is a longitudinal aberration diagram of the lens apparatus of Example 4 at an object distance of 1 m.
Figure 8B:
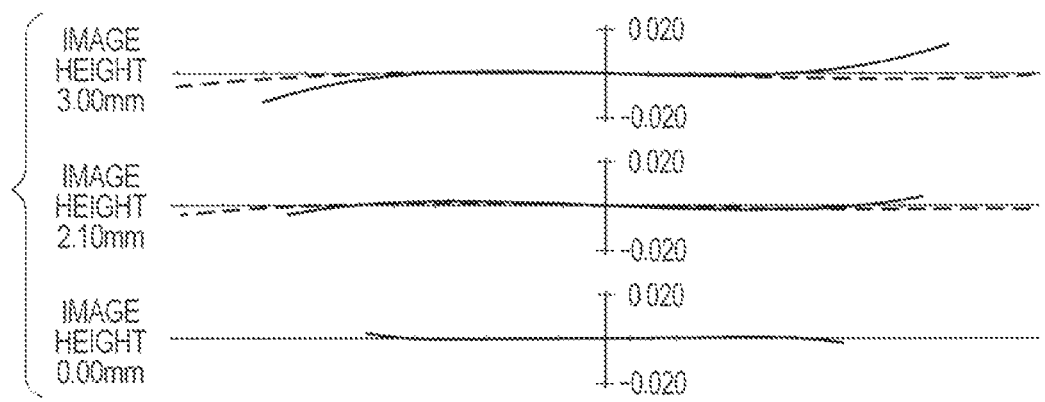
FIG. 8B is a lateral aberration diagram of the lens apparatus of Example 4 at an object distance of 1 m.

Table 1 illustrates correspondence values of Example 4 pertaining to the conditional expressions (1) to (9). Example 4 satisfies all the conditional expressions, and achieves a lens apparatus that has a small f-number, a wide angle of field, low distortion, supports an image pickup element having high resolution, and achieves high optical performance (FIGS. 8A and 8B).

Example 5

Figure 9:
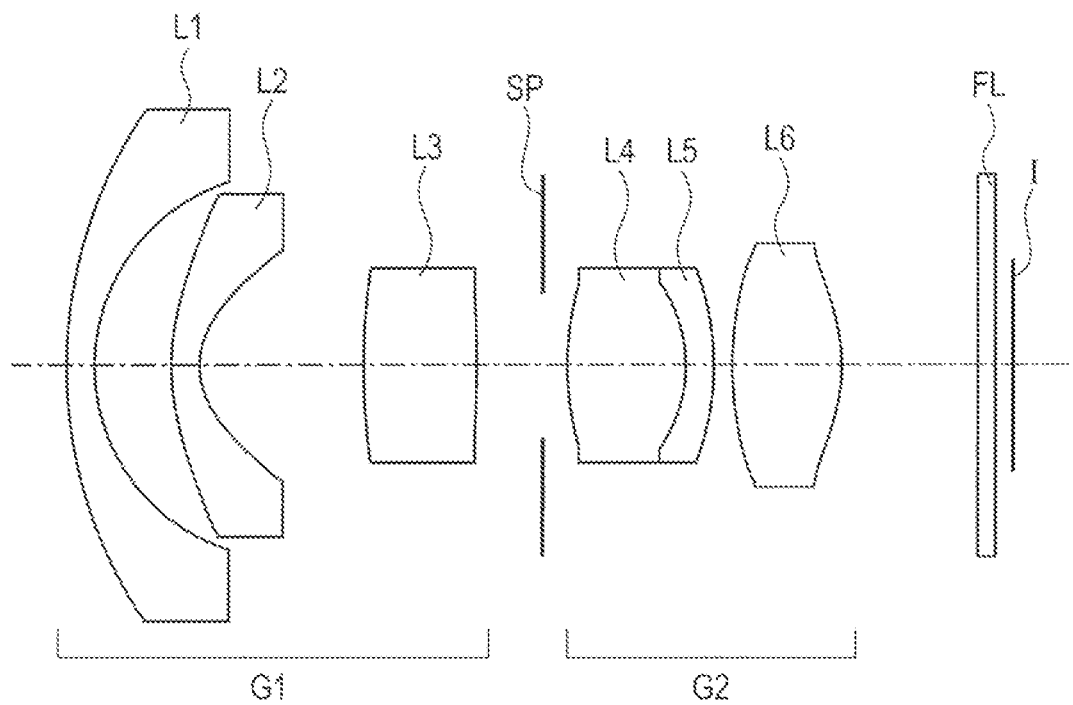
FIG. 9 is a lens sectional diagram of a lens apparatus of Example 5.

FIG. 9 is a lens sectional diagram of a lens apparatus of Example 5 (Numerical Example 5) of the present invention. The lens configuration is completely identical to the configuration of Example 4.

Figure 10A:
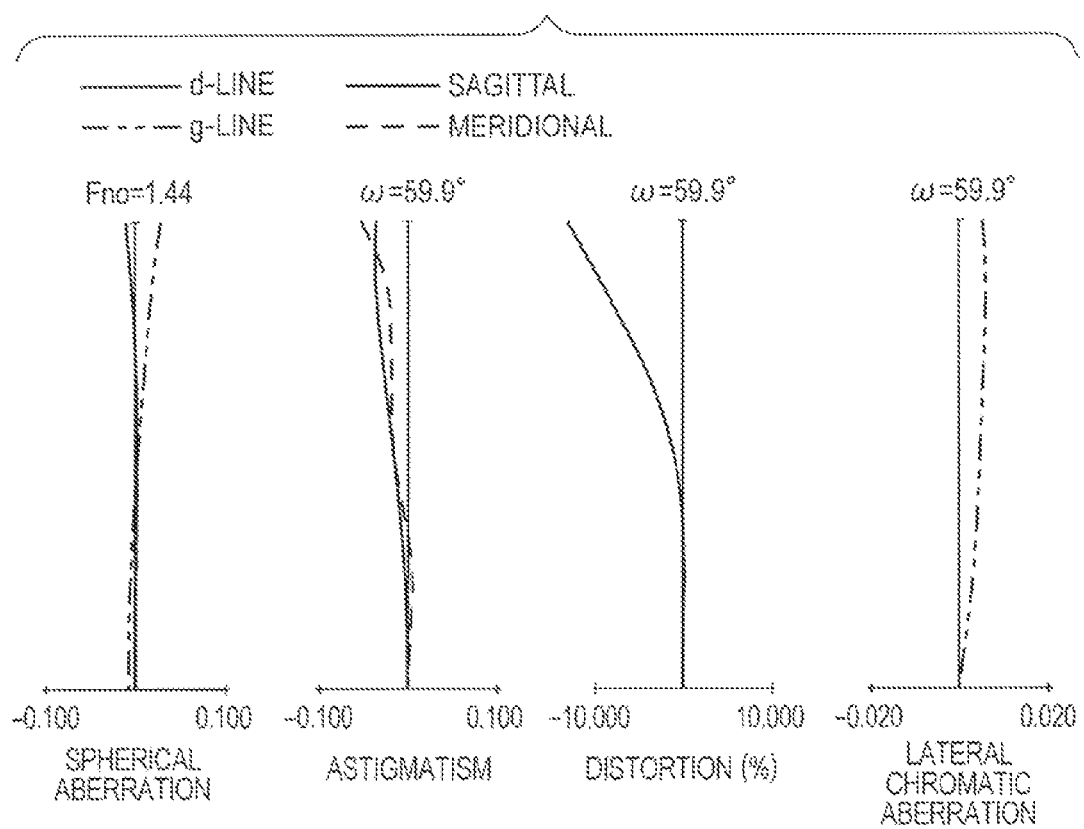
FIGS. 10A and 10B are aberration diagrams of the lens apparatus of Example 5 at an object distance of 1 m.
Figure 10B:
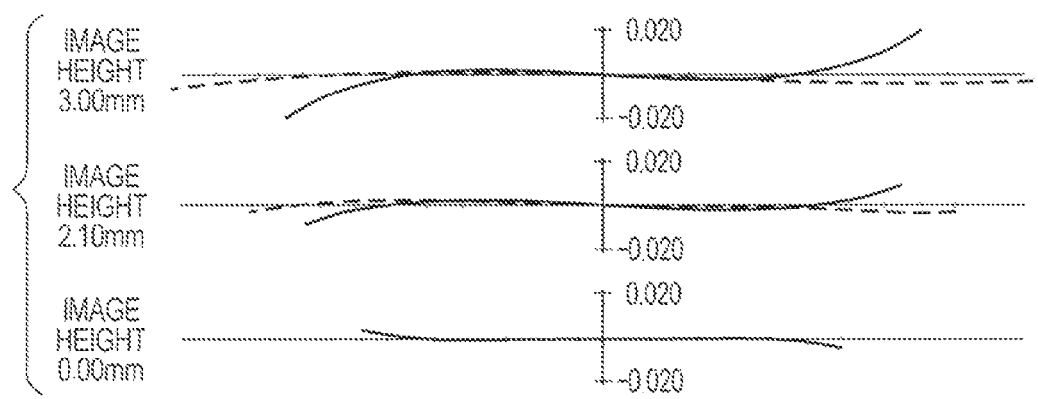

Table 1 illustrates correspondence values of Example 5 pertaining to the conditional expressions (1) to (9). Example 5 satisfies all the conditional expressions, and achieves a lens apparatus that has a small f-number, a wide angle of field, low distortion, supports an image pickup element having high resolution, and achieves high optical performance (FIGS. 10A and 10B).

Second Embodiment

Next, a lens apparatus according to a second embodiment of the present invention is described.

The characteristics of Examples 6 to 10 are described. Here, in Examples 6 to 10, values in the case where a dome cover is mounted are described.

The lens apparatuses according to Examples 6 to 10 according to the present invention include, from an object side to an image side: a detachable concentric-shaped dome cover; and an optical system of the lens apparatus of Example 1, i.e., an optical system including a first lens unit, an aperture stop, and a second lens unit having a positive refractive power. This embodiment further includes a unit for changing an air interval between the first lens unit and the second lens unit on the optical axis according to presence or absence of the dome cover.

Figure 22:
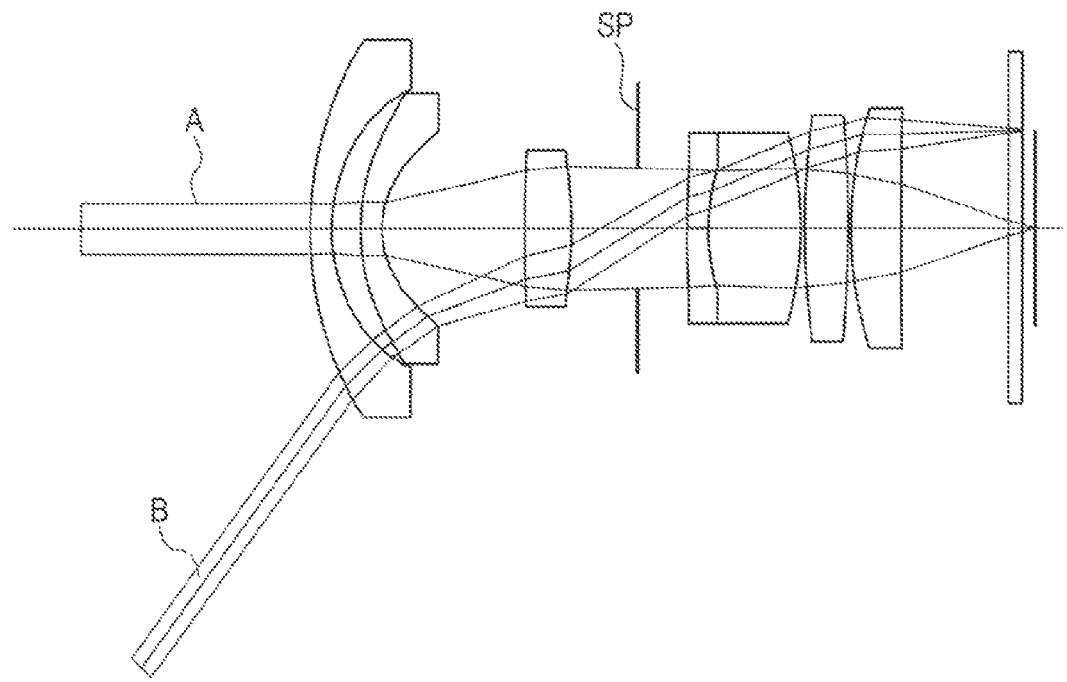
FIG. 22 is an optical path diagram of a lens apparatus of the present invention.

FIG. 22 illustrates an example of an optical path diagram in a lens apparatus of the present invention. In FIG. 22, an axial ray A passes in substantially parallel to the optical axis at an aperture stop SP, and an off-axial ray B passes obliquely to the optical axis. Changing the positional interval, i.e., the interval between the first lens unit and the second lens unit can only correct the off-axial ray without affecting the axial ray.

Figure 11:
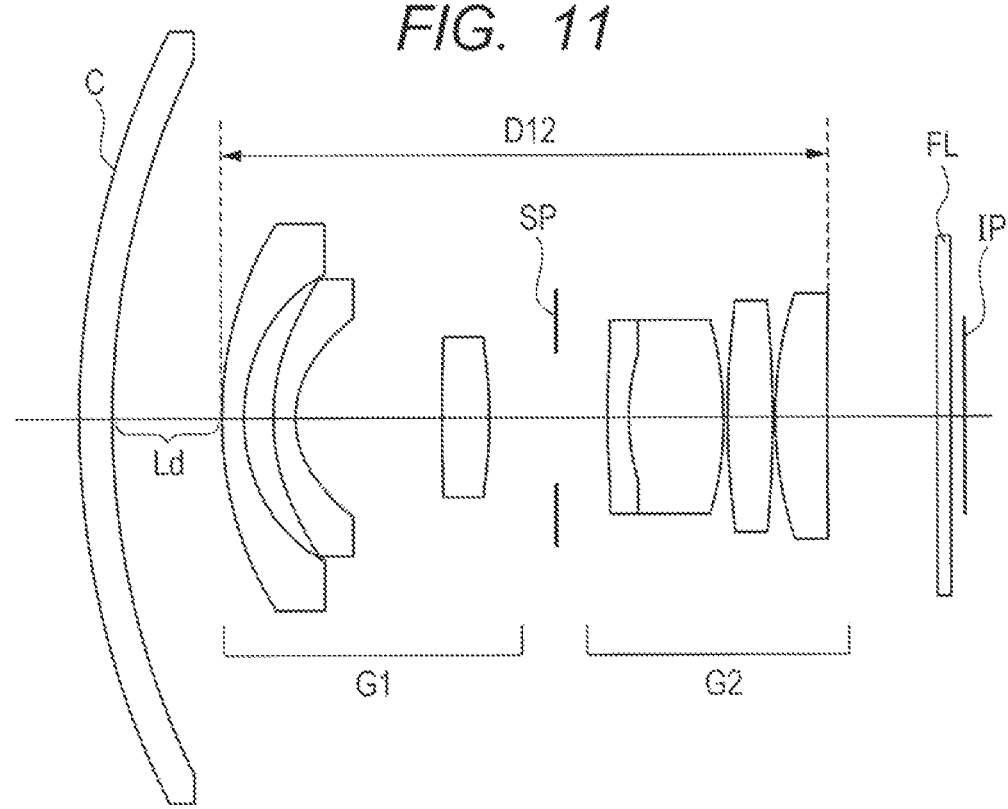
FIG. 11 is a lens sectional diagram of a lens apparatus of Example 6 with a dome cover mounted thereon.

FIG. 11 is a lens sectional diagram of a lens apparatus of Example 6 with a dome cover mounted thereon. The lens sectional diagram of the lens apparatus of this example in the case where the dome cover is not mounted is identical to the sectional view illustrated in FIG. 1. In order from an object side to an image side, a dome cover C, a first lens unit G1, an aperture stop SP, and a second lens unit G2 are arranged. An image plane IP corresponds to an image pickup plane of a solid image pickup element (photoelectric conversion element).

A schematic configuration of the foregoing lens unit is identical among after-mentioned Examples 6 to 10.

Lens apparatuses according to Examples 6 to 10 according to the present invention satisfy the following conditions.

Ld is an air interval on the optical axis between an image-side surface of the dome cover and an object-side surface of the first lens unit in the case where the dome cover is mounted. D12 is a thickness on the optical axis from the object-side surface of the first lens unit to the image-side surface of the second lens unit in the case where the dome cover is mounted. f is the focal length of the optical system (optical system including a first lens unit, an aperture stop, and a second lens unit having a positive refractive power). fd is the focal length of the dome cover. f1 is the focal length of the first lens unit. The following expressions are satisfied.

$$0.02 < Ld/D12 < 1.00 \tag{10}$$

$$-0.0060 < f/fd < -0.0009 \tag{11}$$

$$-0.25 < f/f1 < 0.20 \tag{12}$$

The conditional expression (10) defines a range of the ratio between the thickness on the optical axis from the object-side surface of the first lens unit to the image-side surface of the second lens unit in the case where the dome cover is mounted and the air interval between the image-side surface of the dome cover and the object-side surface of the first lens unit. Satisfaction of the conditional expression (10) reduces the size of the dome cover and suppresses degradation in imaging range peripheral performance in the case where the dome cover is mounted in a compatible manner. If the upper limit of the conditional expression (10) is exceeded, the interval from the dome cover to the first lens unit becomes too large to increase the size of the dome cover, which is unfavorable. If the lower limit of the conditional expression (10) is fallen short, the interval from the dome cover to the first lens unit becomes too small, the incident angle of the off-axial ray onto the dome cover becomes large, and imaging range peripheral performance is degraded, which is unfavorable.

The conditional expression (11) defines the ratio between the focal length of the optical system and the focal length of the dome cover. Satisfaction of the conditional expression (11) can reduce the size of the dome cover and suppress degradation in performance in the case where the dome cover is mounted. If the upper limit of the conditional expression (11) is exceeded, the refractive power of the dome cover becomes too weak, thereby increasing the size of the dome cover. If the lower limit of the conditional expression (11) is fallen short, the refractive power of the dome cover becomes too strong to degrade imaging range peripheral performance when the dome cover is mounted. This degradation is unfavorable.

The conditional expression (12) defines the ratio between the focal length of the optical system and the focal length of the first lens unit. If the upper limit of the conditional expression (12) is exceeded, the convergence degree of an axial ray incident on the second lens unit becomes too large. If the convergence degree becomes too large, variation in spherical aberration becomes large during changing of the air interval between the first lens unit and the second lens unit according to presence or absence of the dome cover. This large variation is unfavorable. Furthermore, if the convergence degree becomes too large, it becomes difficult to secure a sufficient back focus. If the lower limit of the conditional expression (12) is fallen short, the divergence degree of a light flux incident on the second lens unit becomes too large, and variation in spherical aberration becomes large during changing the air interval between the first lens unit and the second lens unit according to presence or absence of the dome cover. This large variation is unfavorable. Furthermore, if the divergence degree becomes too large, it thus becomes difficult to correct various aberrations.

Moreover, the conditional expressions (10) to (12) are favorably configured as follows, $$0.04 < Ld/D12 < 0.90. \tag{10a}$$

$$-0.0050 < f/fd < -0.0015 \tag{11a}$$

$$-0.19 < f/f1 < 0.12 \tag{12a}$$

Furthermore, in Examples 5 to 10, θp is the angle between an off-axial principal ray and the optical axis at the intersection with the optical axis; the off-axial principal ray corresponds to the maximum image height in subject light received by the image pickup element. f2 is the focal length of the second lens unit. φt is the entrance pupil diameter of the optical system for an infinity object in the case where the dome cover is mounted. φd/2 is the maximum ray height on the object-side surface of the dome cover (the distance between a position where an off-axial ray corresponding to the maximum image height passes through the dome cover and the optical axis). R1 is the curvature radius of an object-side surface of the dome cover. R2 is the curvature radius of an image-side surface of the dome cover. At least one of the following conditional expressions is further favorably satisfied.

$$0.30 < |\sin \theta p| < 0.70 \tag{13}$$

$$0.33 < f/f2 < 0.60 \tag{14}$$

$$0.010 < \phi t/\phi d < 0.180 \tag{15}$$

$$20.0 < (R1+R2)/(R1-R2) < 80.0 \tag{16}$$

The conditional expression (13) defines a range of the angle between an off-axial principal ray and the optical axis; the off-axial principal ray corresponds to subject light that is received by the image pickup element and at the maximum image height at the aperture stop position. Satisfaction of the conditional expression (13) can suppress deviation from focus around the imaging range when the interval between the first lens unit and the second lens unit changes according to presence or absence of the dome cover. If the upper limit of the conditional expression (13) is exceeded, the incident angle on the second lens unit becomes too large, and variation in off-axial aberration that depends on the interval change becomes large. This variation is difficulty in manufacturing. If the lower limit of the conditional expression (13) is fallen short, the incident angle on the second lens unit becomes too small to increase the amount of interval adjustment, and the size of the optical system is increased, which is unfavorable.

The conditional expression (14) defines the ratio between the focal length f of the entire system and the focal length f2 of the second lens unit. If the upper limit of the conditional expression (14) is exceeded, the refractive power of the second lens unit becomes too strong, and correction of various aberrations becomes difficult. If the lower limit of the conditional expression (14) is fallen short, the refractive power becomes too weak, and it thus becomes difficult to achieve an angle of field sufficiently wide for monitoring usage.

The conditional expression (15) defines the ratio between the entrance pupil diameter of the optical system for an infinity object in the case where the dome cover is mounted and twofold of the maximum ray height of the object-side surface of the dome cover. Satisfaction of the conditional expression (15) suppresses variation in performance according to presence or absence of the dome cover. If the upper limit of the conditional expression (15) is exceeded, the maximum ray height on the dome cover becomes too small, and the dome cover approaches the optical system. Accordingly, the refractive power of the dome cover becomes too strong, and peripheral performance is degraded when the dome cover is mounted. This degradation is unfavorable. Furthermore, since the entrance pupil diameter of the optical system increases, variation in spherical aberration increases according to presence or absence of the dome cover. This increase is unfavorable. If the lower limit of the conditional expression (6) is fallen short, the maximum ray height of the dome cover becomes too large to increase the size of the dome cover. This increase is unfavorable.

The conditional expression (16) defines the shapes of the object-side surface and the image-side surface of the dome cover. If the upper limit of the conditional expression (16) is exceeded, the curvature radii of the object-side surface and the image-side surface of the dome cover become too large to increase the size of the dome cover. This increase is unfavorable. If the lower limit of the conditional expression (16) is fallen short, the curvature radii of the object-side surface and the image-side surface of the dome cover become too small to strengthen the refractive power of the dome cover. Thus, various aberrations largely vary according to presence or absence of the dome cover. This variation is unfavorable.

The numerical ranges of the conditional expressions (13) to (16) are further favorably configured as follows, $$0.40 < |\sin \theta p| < 0.60, \tag{13a}$$

$$0.35 < f/f2 < 0.47, \tag{14a}$$

$$0.030 < \phi t/\phi d < 0.140 \text{ and} \tag{15a}$$

$$25.0 < (R1+R2)/(R1-R2) < 65.0. \tag{16a}$$

In Examples 6 to 10, the following condition is further favorably satisfied.

$$0.50 < f^2/(Y \times Fno) < 2.50 \text{(unit mm)} \tag{17}$$

where f is the focal length of the entire system, Y is the maximum image height, and Fno is the open f-number in the infinity focusing state.

The optical system of the present invention adopts a deep focus lens, thereby favorably achieving an image pickup apparatus without focus adjusting mechanism. In the deep focus lens, a distance range from infinity to the minimum object distance is within the range of depth of field. The minimum object distance is sh/2, which is a half of the hyperfocal distance sh. Accordingly, for imaging in focus over a wider distance range, a small hyperfocal distance sh is more favorable.

The conditional expression (17) defines the hyperfocal distance in a deep focus lens, which is the minimum object distance. The hyperfocal distance sh is defined as $sh = f^2/(\epsilon \times Fno)$, where $\epsilon$ is the permissible circle of confusion. Furthermore, $\epsilon$ is proportional to the pixel pitch p in a diagonal direction of an image pickup element I. Thus, a relationship of $\epsilon \propto p$ holds. The pixel pitch p can be represented as $p = 2 \times Y/n$ using the number of pixels n in the diagonal direction of the image pickup element and the maximum image height Y. Accordingly, representation of the hyperfocal distance sh can be replaced with representation of $sh \propto f^2/(Y \times Fno)$. If the upper limit of the conditional expression (17) is exceeded, the minimum object distance increases. Accordingly, operation as a deep focus lens becomes difficult, or it becomes difficult to achieve a sufficient angle of field. This difficulty is unfavorable. In contrast, if the lower limit of the conditional expression (17) is fallen short, it becomes difficult to maintain sufficient brightness, or the refractive power of the lens becomes strong and it thus becomes difficult to achieve high performance. This difficulty is unfavorable.

Furthermore, the conditional expression (17) is favorably configured as follows, $$0.90 < f^2/(Y \times Fno) < 1.80. \text{(unit mm)} \tag{17a}$$

Example 6

Figure 12:
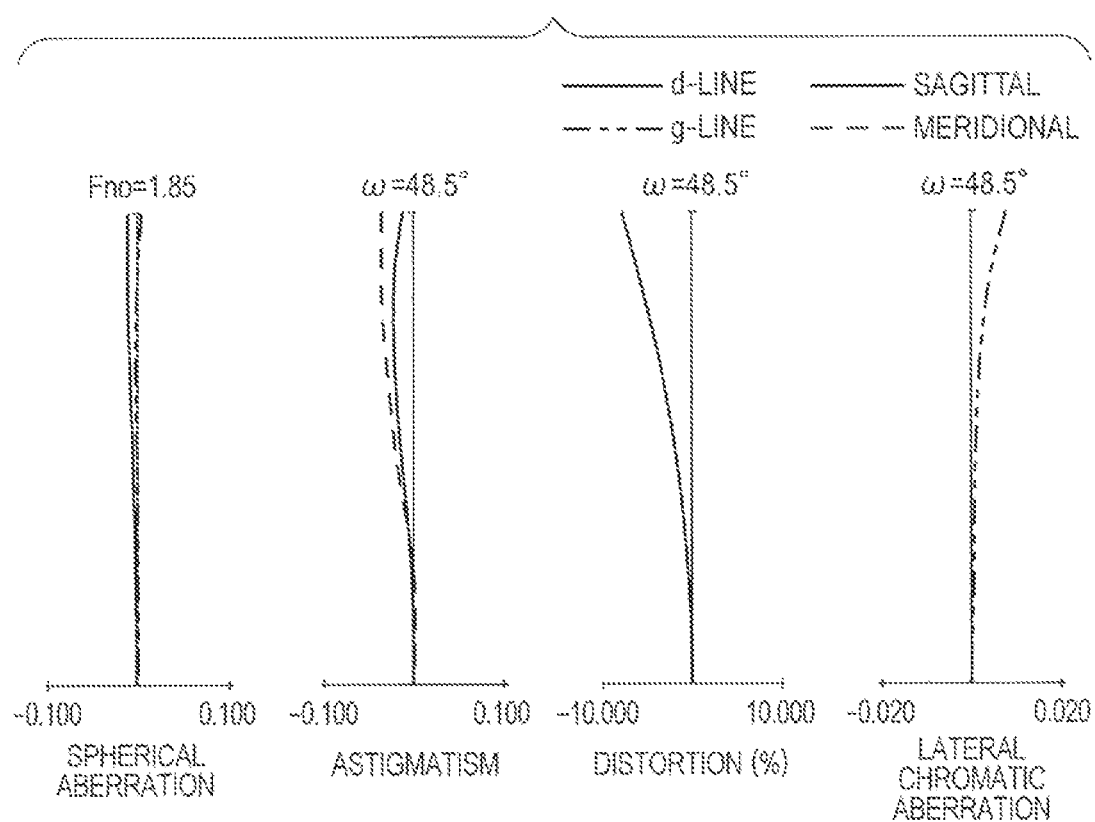
FIG. 12 is a longitudinal aberration diagram of the lens apparatus of Example 6 at an object distance of 1 m with the dome cover mounted thereon.

Next, the lens configurations of the respective units of Example 6 (Numerical Example 6) are described with reference to FIG. 11, which is a sectional view in the case where the dome cover is mounted. In the lens sectional view, the left side corresponds to the object side, and the right side corresponds to the image side. The lens apparatus of Example 6 includes, in order from an object side to an image side: a detachable dome cover C; a first lens unit G1; a stop SP; and a second lens unit G2. The first lens unit G1 includes: two negative lenses; and one positive lens. The second lens unit G2 includes: a cemented lens including a negative lens and a positive lens; and two positive lenses. FIG. 11 illustrates a sectional view of the lens apparatus of Example 1 of the present invention with the dome cover mounted thereon. In the case where the dome cover C is not mounted, the configuration and arrangement are identical to those of the lens apparatus of Example 1 illustrated in FIG. 1. To suppress deviation from focus around the imaging range according to presence or absence of the dome cover C, the air interval between the first lens unit G1 and the second lens unit G2 is changed. In Example 6, the amount of change of the air interval is 0.055 mm. The air interval is shorter by 0.055 mm in the case where the dome cover is mounted than in the case where dome cover is not mounted (arrangement of the lens apparatus of Example 1). FIG. 12 illustrates a longitudinal aberration diagram of the lens apparatus of Example 6 at an object distance of 1 m with the dome cover mounted thereon. In the case where the dome cover C is not mounted, the longitudinal aberration diagram is identical to the diagram of the lens apparatus of Example 1 illustrated in FIG. 2A. In the aberration diagram, spherical aberration is illustrated for d-line and g-line, astigmatism is illustrated on a meridional image plane (ΔM) for d-line and a sagittal image plane (ΔS) for d-line, and lateral chromatic aberration is illustrated for g-line. Fno is the f-number. ω is the half angle of field. In all the following aberration diagrams, spherical aberration is illustrated with a scale of 0.1 mm, astigmatism is illustrated with a scale of 0.1 mm, distortion is illustrated with a scale of 10%, and lateral chromatic aberration is illustrated with a scale of 0.02 mm. The unit for the values of focal lengths described in the numerical examples is millimeters. The situations are completely identical in all the following numerical examples. As it is apparent from comparison between FIGS. 12 and 2A, variation in focus position around the imaging range with respect to the optical axis position according to presence or absence of the dome cover C is favorably suppressed.

Example 7

Figure 13:
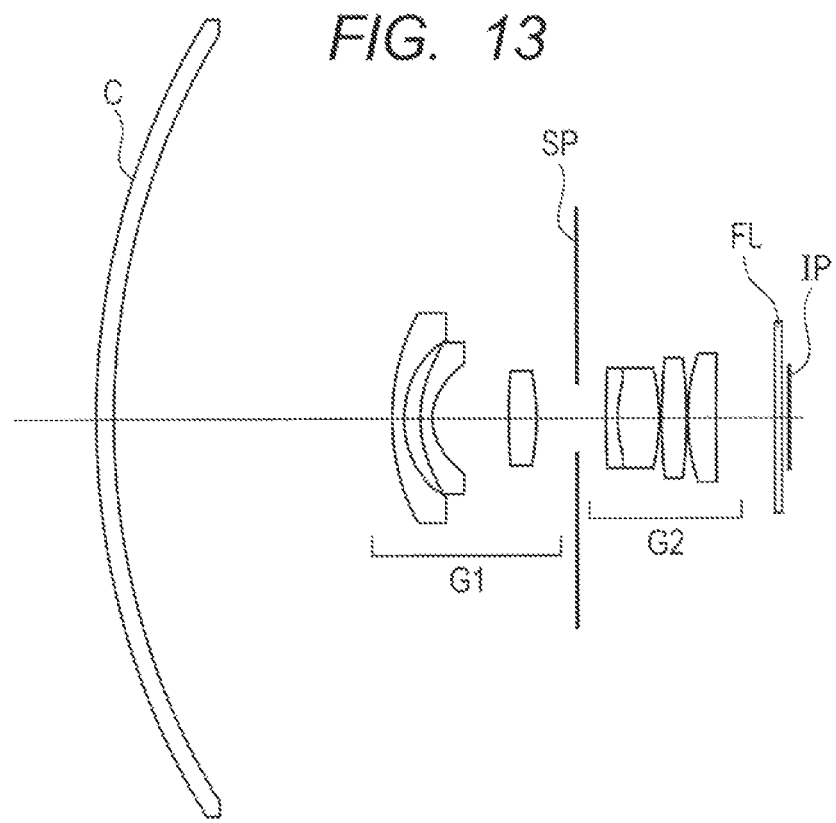
FIG. 13 is a lens sectional diagram of a lens apparatus of Example 7 with a dome cover mounted thereon.
Figure 14:
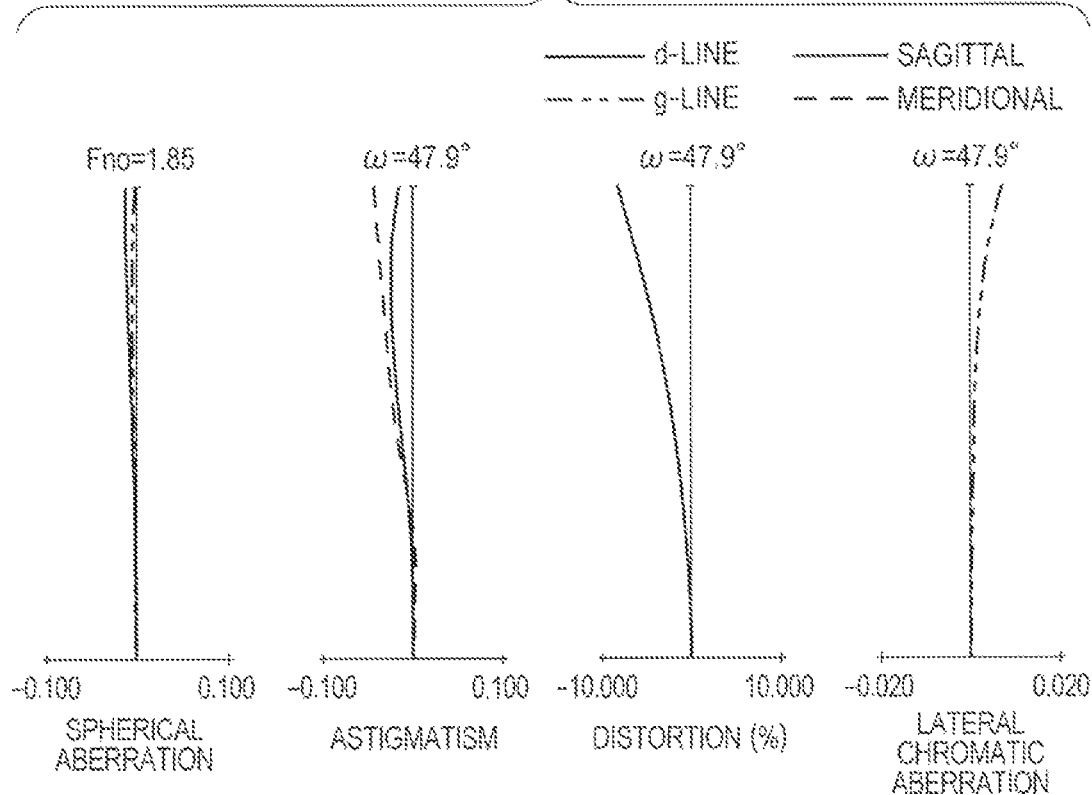
FIG. 14 is a longitudinal aberration diagram of the lens apparatus of Example 7 at an object distance of 1 m with the dome cover mounted thereon.

The lens apparatus of Example 7 (Numerical Example 7) includes, in order from an object side to an image side: a detachable dome cover C; and an optical system of Example 2, which is an optical system including a first lens unit G1, a stop SP and a second lens unit G2. Note that the optical system of this example has a configuration that can change the interval between the first lens unit G1 and the second lens unit G2. The first lens unit G1 includes two negative lenses, and one positive lens. The second lens unit G2 includes a cemented lens including a negative lens and a positive lens, and two positive lenses. FIG. 13 illustrates a sectional view of the lens apparatus of Example 7 of the present invention with the dome cover mounted thereon. In the case where the dome cover C is not mounted, the arrangement is identical to the arrangement of the lens apparatus of Example 2 illustrated in FIG. 3. In Example 7, the amount of change of the air interval according to presence or absence of the dome cover is 0.013 mm. The air interval is shorter by 0.013 mm in the case where the dome cover is mounted than in the case where the dome cover is not mounted. FIG. 14 illustrates a longitudinal aberration diagram of the lens apparatus of Example 7 at an object distance of 1 m with the dome cover mounted thereon. In the case where the dome cover C is not mounted, the longitudinal aberration diagram is identical to the diagram of the lens apparatus of Example 2 illustrated in FIG. 4A. As it is apparent from comparison between FIGS. 14 and 4A, variation in focus position around the imaging range with respect to the optical axis position according to presence or absence of the dome cover C is favorably suppressed.

Example 8

Figure 15:
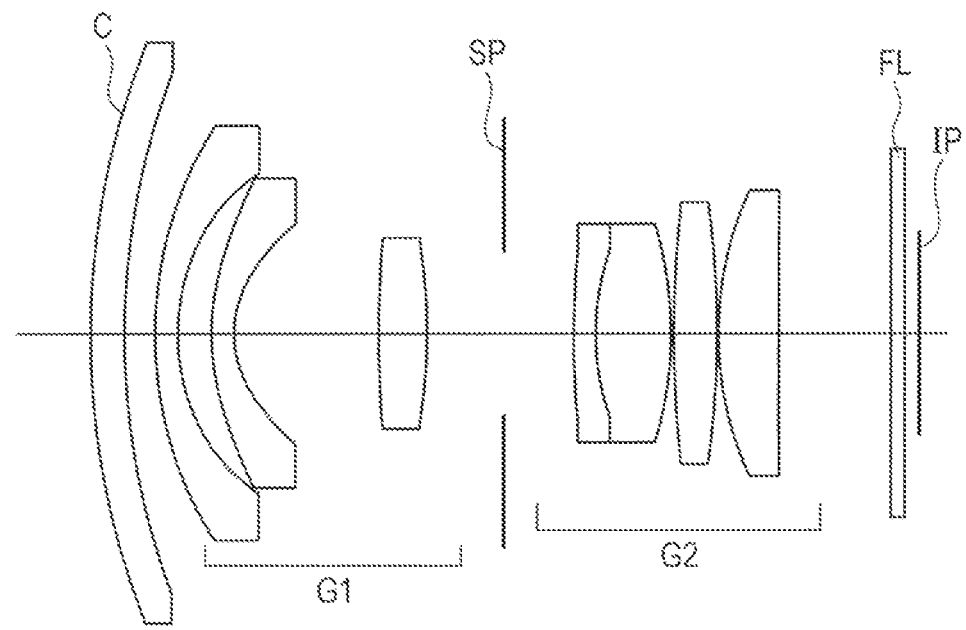
FIG. 15 is a lens sectional diagram of a lens apparatus of Example 8 with a dome cover mounted thereon.
Figure 16:
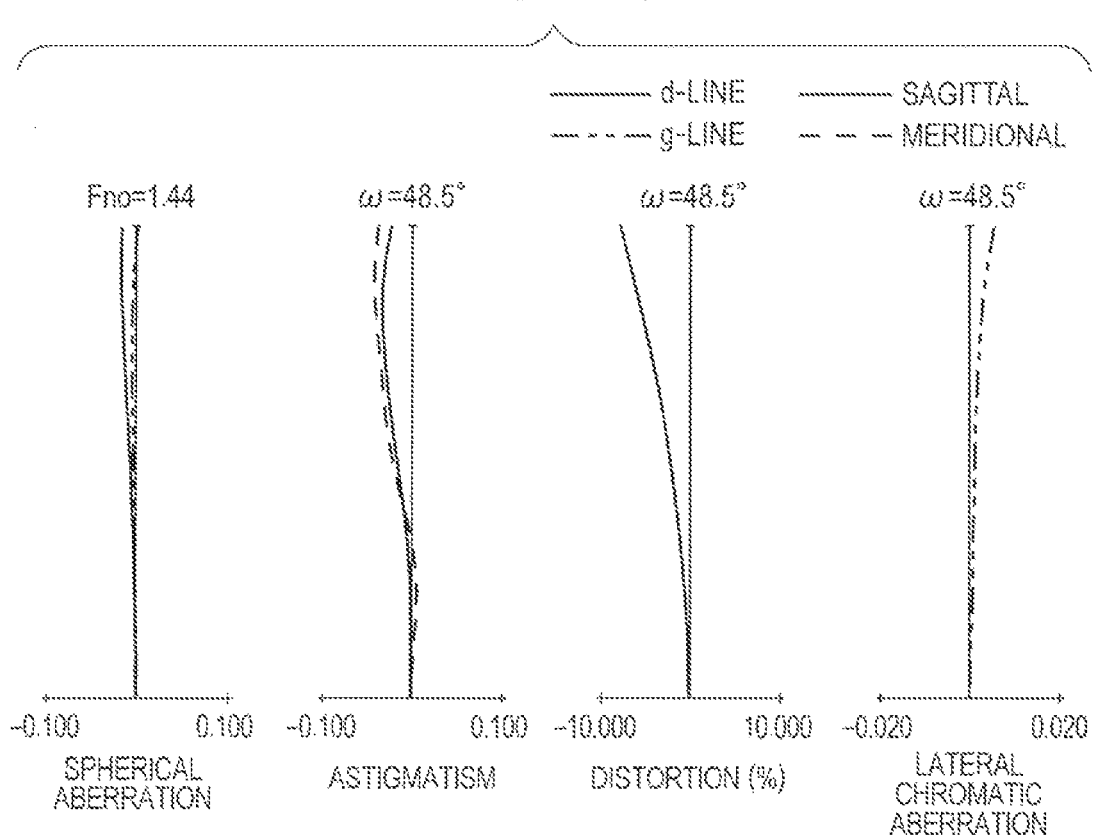
FIG. 16 is a longitudinal aberration diagram of the lens apparatus of Example 8 at an object distance of 1 m with the dome cover mounted thereon.

The lens apparatus of Example 8 (Numerical Example 8) includes, in order from an object side to an image side: a detachable dome cover C; and an optical system of Example 3, which is an optical system including a first lens unit G1, a stop SP and a second lens unit G2. Note that the optical system of this example has a configuration that can change the interval between the first lens unit G1 and the second lens unit G2. The first lens unit G1 includes two negative lenses, and one positive lens. The second lens unit G2 includes a cemented lens including a negative lens and a positive lens, and two positive lenses. FIG. 15 illustrates a sectional view of the lens apparatus of Example 8 of the present invention with the dome cover mounted thereon. In the case where the dome cover C is not mounted, the arrangement is identical to the arrangement of the lens apparatus of Example 3 illustrated in FIG. 5. In Example 8, the amount of change of the air interval according to presence or absence of the dome cover is 0.081 mm. The air interval is shorter by 0.081 mm in the case where the dome cover is mounted than in the case where the dome cover is not mounted. FIG. 16 is a longitudinal aberration diagram of the lens apparatus of Example 8 at an object distance of 1 m with the dome cover mounted thereon. In the case where the dome cover C is not mounted, the longitudinal aberration diagram is identical to the diagram of the lens apparatus of Example 3 illustrated in FIG. 6A. As it is apparent from comparison between FIGS. 16 and 6A, variation in focus position around the imaging range with respect to the optical axis position according to presence or absence of the dome cover C is favorably suppressed.

Example 9

Figure 17:
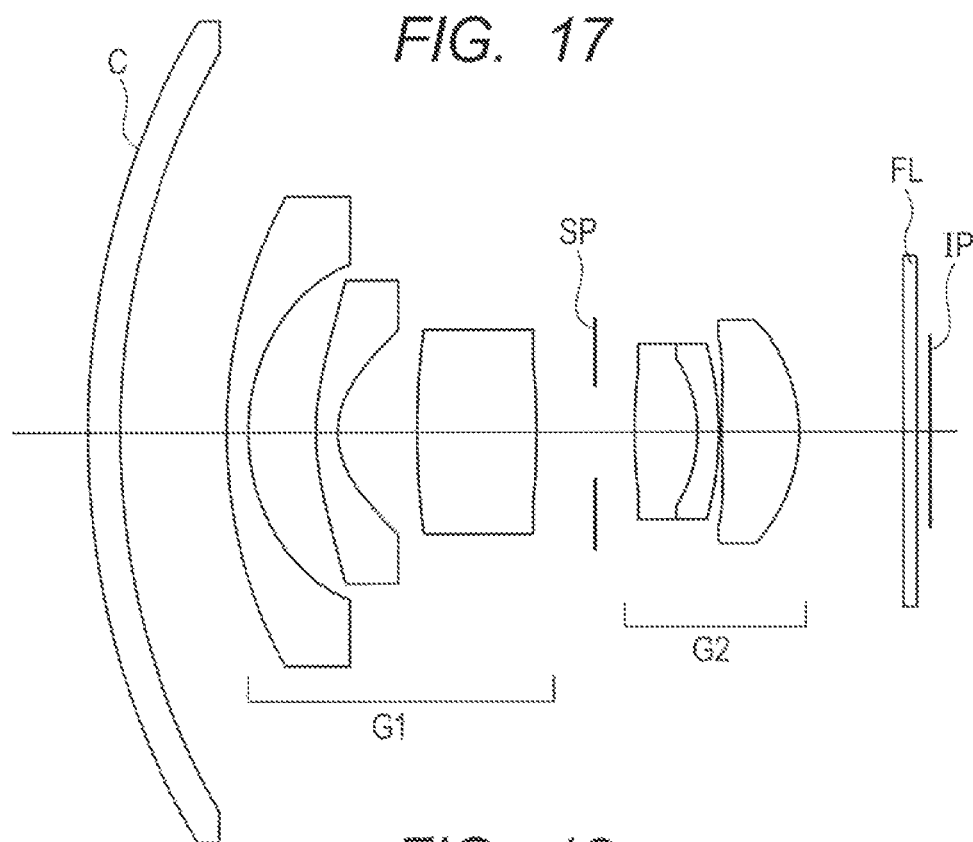
FIG. 17 is a lens sectional diagram of a lens apparatus of Example 9 with a dome cover mounted thereon.
Figure 18:
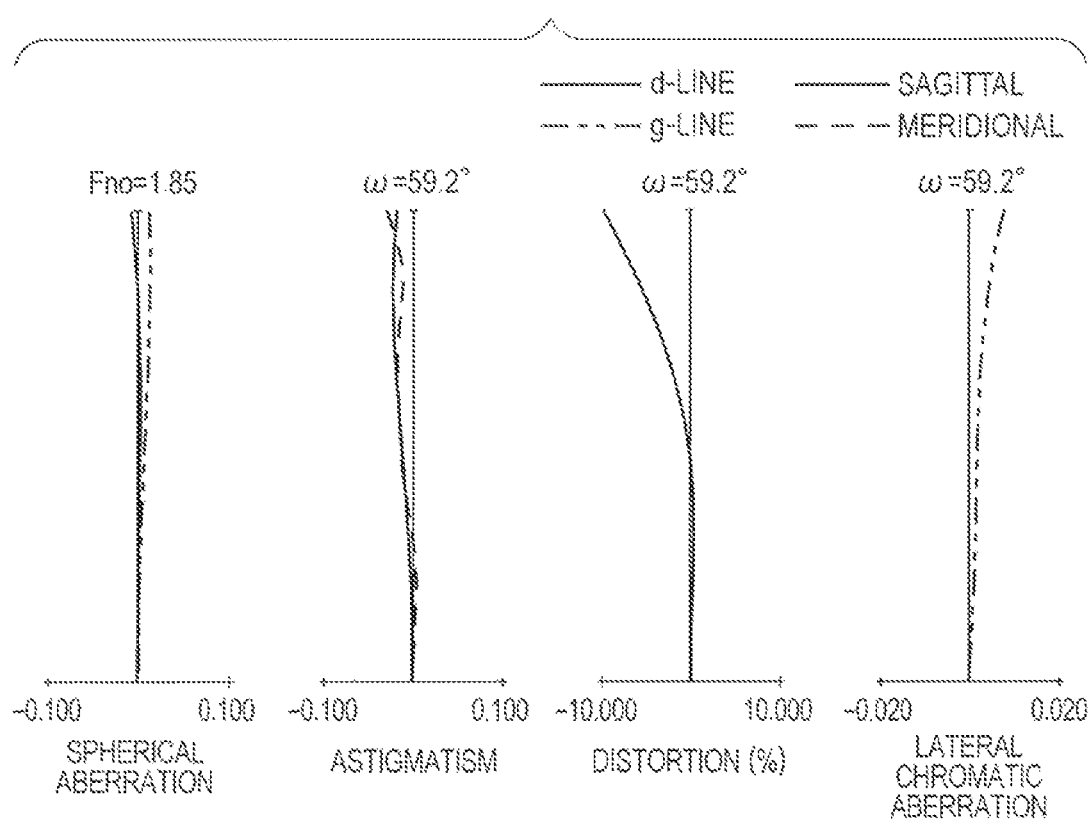
FIG. 18 is a longitudinal aberration diagram of the lens apparatus of Example 9 at an object distance of 1 m with the dome cover mounted thereon.

The lens apparatus of Example 9 (Numerical Example 9) includes, in order from an object side to an image side; a detachable dome cover C; and an optical system of Example 4, which is an optical system including a first lens unit G1, a stop SP and a second lens unit G2. Note that the optical system of this example has a configuration that can change the interval between the first lens unit G1 and the second lens unit G2. The first lens unit G1 includes two negative lenses, and one positive lens. The second lens unit G2 includes a cemented lens including a positive lens and a negative lens, and one positive lens. FIG. 17 illustrates a sectional view of the lens apparatus of Example 9 of the present invention with the dome cover mounted thereon. In the case where the dome cover C is not mounted, the arrangement is identical to the arrangement of the lens apparatus of Example 4 illustrated in FIG. 7. The air interval between the first lens unit and the second lens unit is changed according to presence or absence of the dome cover. In Example 9, the amount of change of the air interval is 0.061 mm. The air interval is shorter by 0.061 mm in the case where the dome cover is mounted than in the case where the dome cover is not mounted. FIG. 18 illustrates a longitudinal aberration diagram of the lens apparatus of Example 9 at an object distance of 1 m with the dome cover mounted thereon. In the case where the dome cover C is not mounted, the longitudinal aberration diagram is identical to the diagram of the lens apparatus of Example 4 illustrated in FIG. 8A. As it is apparent from comparison between FIGS. 18 and 8A, variation in focus position around the imaging range with respect to the optical axis position according to presence or absence of the dome cover C is favorably suppressed.

Example 10

Figure 19:
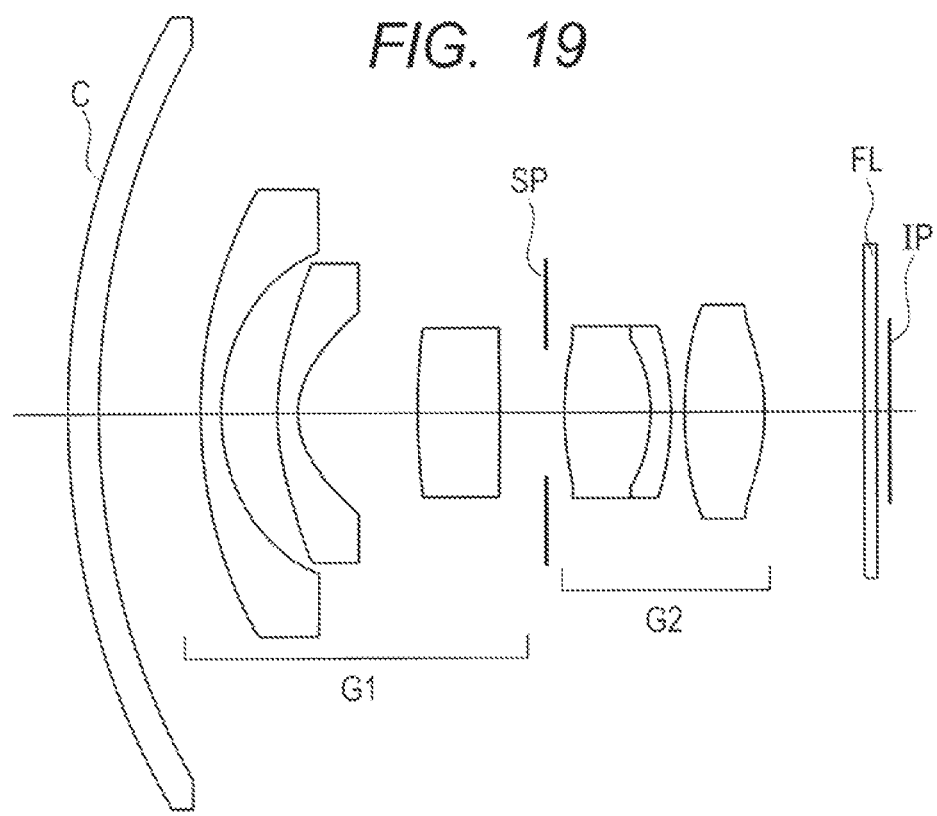
FIG. 19 is a lens sectional diagram of a lens apparatus of Example 10 with a dome cover mounted thereon.
Figure 20:
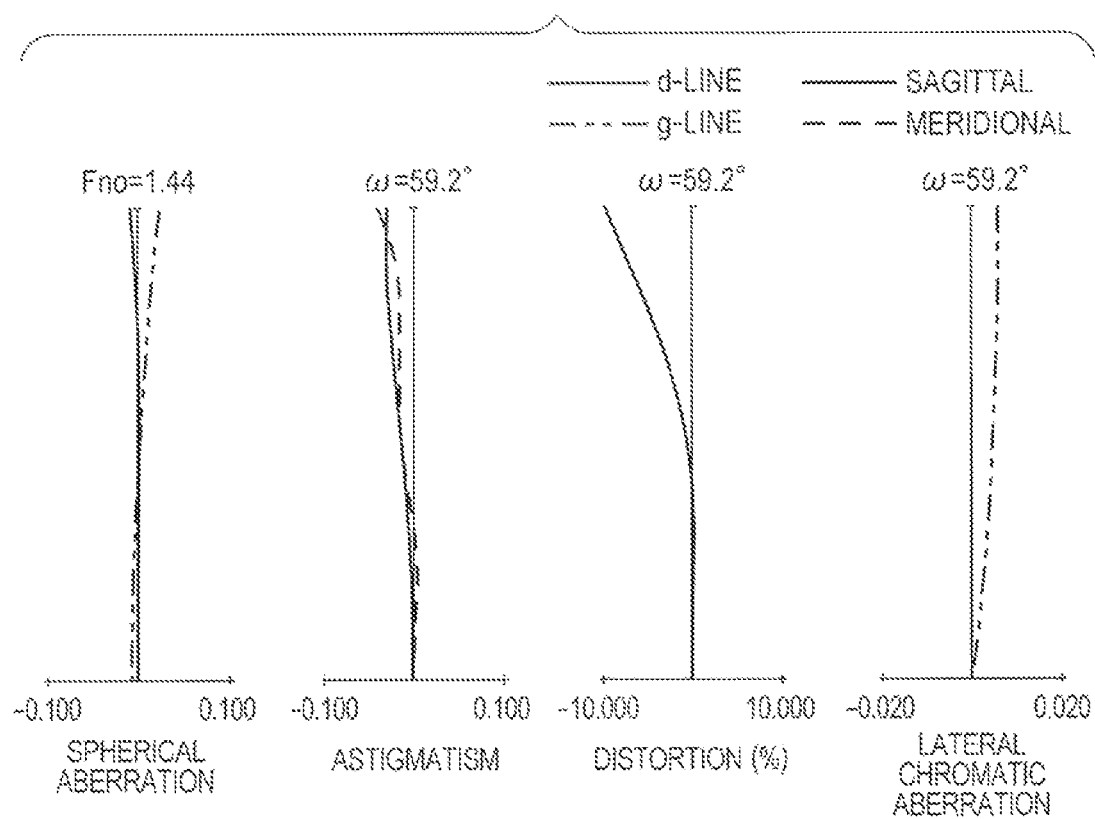
FIG. 20 is a longitudinal aberration diagram of the lens apparatus of Example 10 at an object distance of 1 m with the dome cover mounted thereon.

The lens apparatus of Example 10 (Numerical Example 10) includes, in order from an object side to an image side: a detachable dome cover C; and an optical system of Example 4, which is an optical system including a first lens unit G1, a stop SP and a second lens unit G2. Note that the optical system of this example has a configuration that can change the interval between the first lens unit G1 and the second lens unit G2. The first lens unit G1 includes two negative lenses, and one positive lens. The second lens unit G2 includes a cemented lens including a positive lens and a negative lens, and one positive lens. FIG. 19 illustrates a sectional view of the lens apparatus of Example 10 of the present invention with the dome cover mounted thereon. In the case where the dome cover C is not mounted, the arrangement is identical to the arrangement of the lens apparatus of Example 5 illustrated in FIG. 9. The air interval between the first lens unit and the second lens unit is changed according to presence or absence of the dome cover. In Example 10, the amount of change of the air interval according to presence or absence of the dome cover is 0.080 mm. The air interval is shorter by 0.080 mm in the case where the dome cover is mounted than in the case the dome cover is not mounted. FIG. 20 illustrates a longitudinal aberration diagram of the lens apparatus of Example 10 at an object distance of 1 m with the dome cover mounted thereon. In the case where the dome cover C is not mounted, the longitudinal aberration diagram is identical to the diagram of the lens apparatus of Example 5 illustrated in FIG. 10A. As it is apparent from comparison between FIGS. 20 and 10A, variation in focus position around the imaging range with respect to the optical axis position according to presence or absence of the dome cover C is favorably suppressed.

Figure 21A:
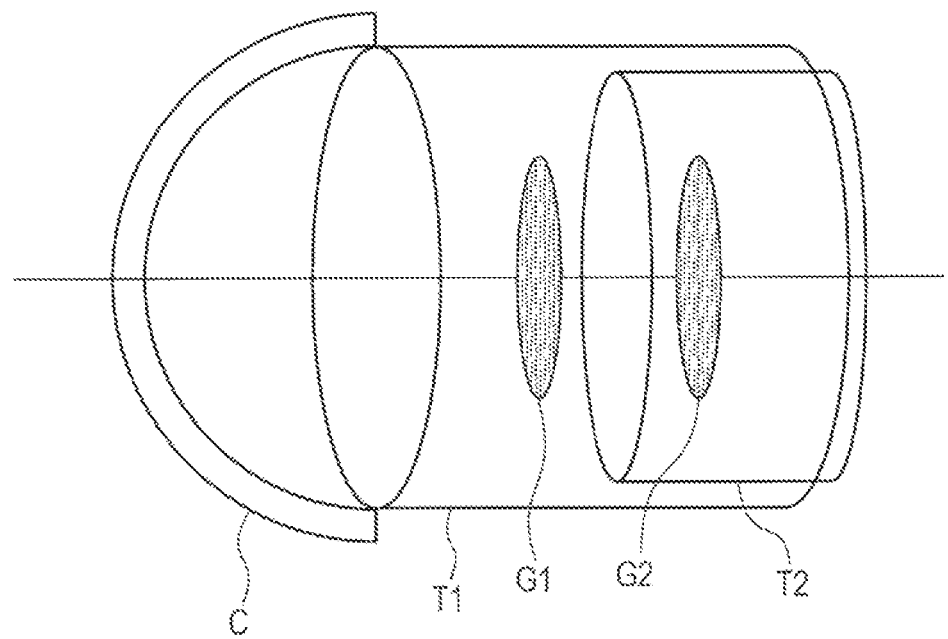
FIG. 21A is a schematic diagram of an interval adjusting mechanism of a lens apparatus of the present invention.
Figure 21B:
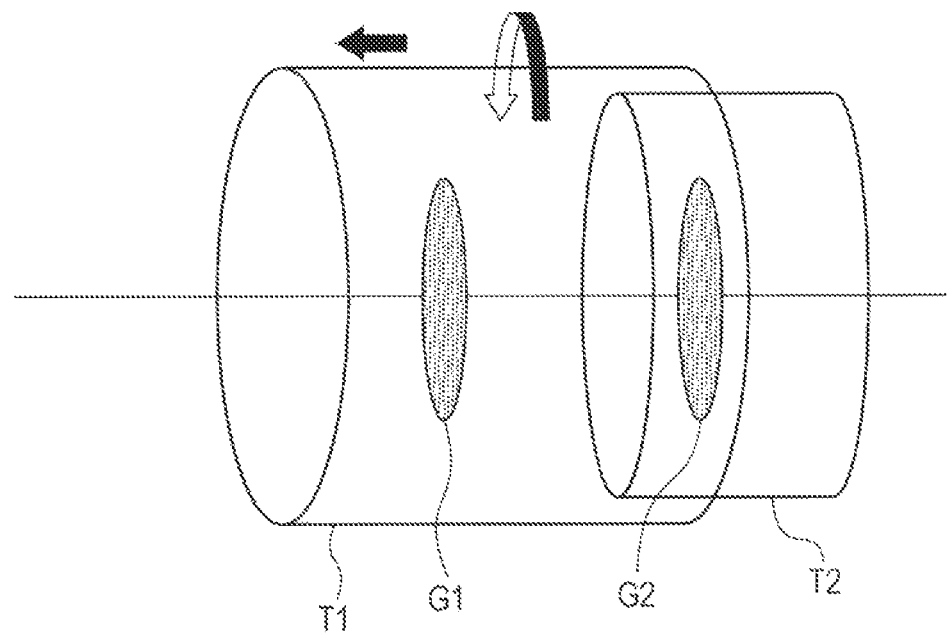
FIG. 21B is a schematic diagram of the interval adjusting mechanism of the lens apparatus of the present invention.

FIGS. 21A and 21B are schematic diagrams illustrating an example of a unit for changing the air interval on the optical axis between a first lens unit G1 and a second lens unit G2 of the lens apparatus of any of Examples 6 to 10 of the present invention. As illustrated in FIGS. 21A and 21B, the first lens unit G1 is held by a lens barrel T1, and the second lens unit G2 is held by a lens barrel T2. The lens barrels T1 and T2 are mechanically connected by a mechanism, which is not illustrated, in a manner capable of rotating about the optical axis. According to the mechanism, the lens barrel T1 is advanced with respect to the lens barrel T2 when the lens barrel T1 is rotated in a certain direction with respect to the lens barrel T2. As a result, the interval between the first lens unit G1 and the second lens unit G2 increases. FIG. 21A illustrates a dome cover C. FIG. 21A illustrates a state where the dome cover C is mounted on the optical system of the lens apparatus. FIG. 21B illustrates a state where the dome cover C is away from the optical system of the lens apparatus. The interval between the first lens unit G1 and the second lens unit G2 is adjusted by rotating the lens barrel T1 by a prescribed rotation angle. Changing the interval using this mechanism suppresses variation in focus position around the imaging range with respect to the center according to presence or absence of the dome cover C to be mounted on the optical system. FIGS. 21A and 21B illustrate one example of the mechanism for changing the air interval on the optical axis between the first lens unit and the second lens unit of the lens apparatus of the present invention. It is a matter of course that another unit for changing the interval may be adopted. For instance, the mechanism may be a mechanism of advancing the first lens unit through a focus adjusting mechanism, or a mechanism of changing the lens interval by changing the thickness of a spacer defining the lens interval.

As described above, the lens apparatuses of Examples 6 to 10 suppress variation in focus position around the imaging range with respect to the center of the imaging range according to presence or absence of the dome cover, and achieves a small optical system having high optical performance.

Figure 23:
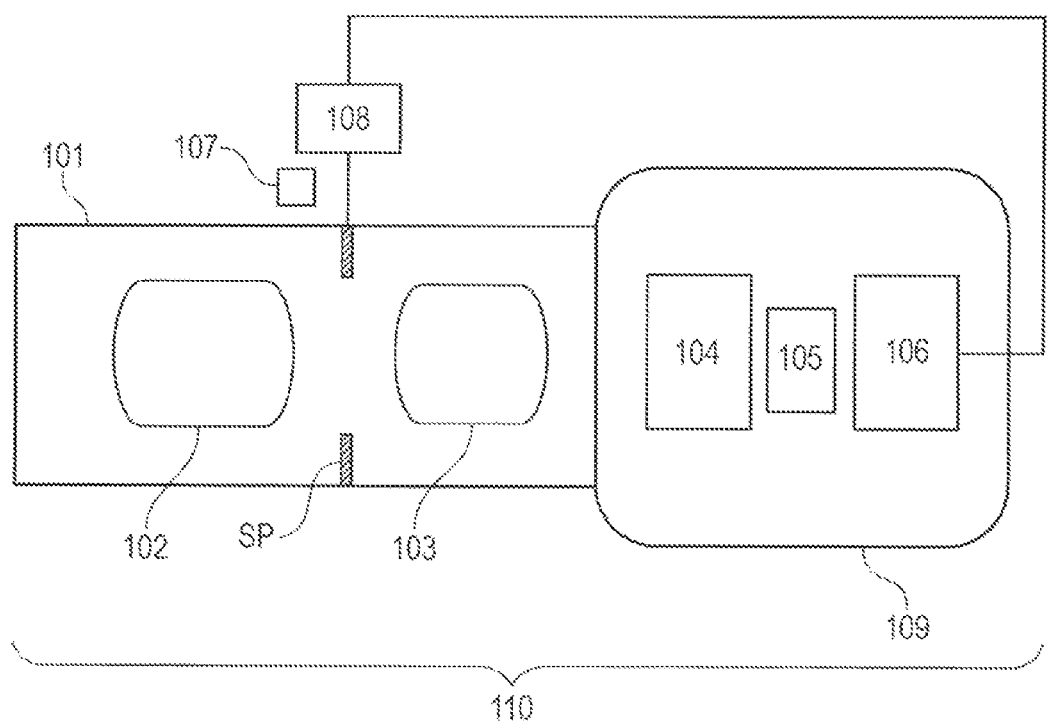
FIG. 23 is a schematic diagram of principal parts of an image pickup apparatus of the present invention.

FIG. 23 is a schematic diagram of principal parts of an image pickup apparatus 110 that adopts a lens apparatus of any of Examples 1 to 10 as an imaging optical system. FIG. 23 illustrates a lens apparatus 101 of any of Examples 1 to 10, a first lens unit 102, an aperture stop SP, and a second lens unit 103. An image pickup unit 109 includes an image pickup element.

A drive unit 108 is a motor for electrically driving a focusing unit and the aperture stop SP. A detection unit 107, such as an encoder, a potentiometer or a photo-sensor, is for detecting the position of the focusing unit on the optical axis or the aperture diameter of the aperture stop SP. A glass block 104 corresponds to a low-pass filter or an IR cut filter in a camera 109. A solid image pickup element 105 (photoelectric conversion element), such as a CCD sensor or a CMOS sensor, receives light of a subject image formed by the lens apparatus 101. A CPU 106 controls various types of driving the lens apparatus 101 and operation of image processing.

Such application of the lens apparatus of the present invention to an image pickup camera achieves an image pickup apparatus having high optical performance.

The favorable examples of the present invention have been described above. It is however a matter of course that the present invention is not limited to these examples. The present invention can be variously changed or modified within the range of the gist thereof.

Numerical Examples 1 to 10 for the respective Examples 1 to 10 of the present invention are hereinafter described. In each Numerical Example, the surface number indicates the order of a surface from an object side. r is a curvature radius. d is a lens thickness or a surface interval. nd and vd are the refractive index of an optical component for d-line and the Abbe constant with reference to d-line, respectively. The effective diameter is the maximum effective region through which a ray passes. A symbol * is assigned to the surface number of an aspheric surface. In this specification, the refractive index and the Abbe constant are a refractive index for d-line and an Abbe constant with reference to d-line, respectively.

An X-axis extends along the optical axis direction. An H-axis extends along a direction perpendicular to the optical axis. The light traveling direction is defined as a positive direction. R is the paraxial curvature radius. k is the conic constant. A4, A6, A8, A10 and A12 are respective aspheric surface coefficients. An aspheric surface shape is represented by Expression A. "e−Z" means "×10$^{-Z}$".

Expression 1

$$X = \frac{H^2/R}{1+\sqrt{1-(1+k)(H/R)^2}} + \qquad (A)$$

$$A4H^4 + A6H^6 + A8H^8 + A10H^{10} + A12H^{12}$$

Numerical Example 1

| Unit mm | | | | | |
|---|---|---|---|---|---|
| Surface data | | | | | |
| Surface number | r | d | nd | vd | Effective diameter |
| 1 | 9.506 | 0.80 | 1.80400 | 46.6 | 10.60 |
| 2 | 4.605 | 1.06 | | | 7.94 |
| 3* | 5.351 | 0.80 | 1.58313 | 59.4 | 7.71 |
| 4* | 2.411 | 5.32 | | | 6.00 |
| 5 | 44.521 | 1.72 | 2.00069 | 25.5 | 4.45 |

-continued

Unit mm

| | | | | | |
|---|---|---|---|---|---|
| 6 | -11.719 | 2.47 | | | 4.02 |
| 7 (Stop) | ∞ | 1.87 | | | 3.67 |
| 8 | 23.066 | 0.80 | 1.95906 | 17.5 | 3.59 |
| 9 | 5.578 | 3.43 | 1.55332 | 71.7 | 3.49 |
| 10 | -8.933 | 0.15 | | | 5.40 |
| 11 | 20.695 | 1.63 | 1.49700 | 81.5 | 5.98 |
| 12 | -30.189 | 0.09 | | | 6.43 |
| 13 | 9.814 | 1.89 | 1.77250 | 49.6 | 6.81 |
| 14 | 184.683 | 3.99 | | | 6.69 |
| 15 | ∞ | 0.50 | 1.51633 | 64.1 | 10.00 |
| 16 | ∞ | 0.50 | | | 10.00 |
| Image plane | ∞ | | | | |

Aspheric surface data

Third surface

K = -1.04978e+000    A 4 = 1.81276e-003    A 6 = -2.22766e-004
A 8 = 1.40361e-005   A10 = -5.52816e-007   A12 = 1.00402e-008

Fourth surface

K = -9.51025e-001    A 4 = 5.11349e-003    A 6 = -4.40018e-004
A 8 = 3.54637e-005   A10 = -3.15904e-006   A12 = 1.08491e-007

Various types of data

| | |
|---|---|
| Focal length | 2.90 |
| F-number | 1.85 |
| Half angle of field | 48.98 |
| Image height | 3.00 |
| Lens total length | 26.86 |
| BF | 4.82 |
| Entrance pupil position | 4.94 |
| Exit pupil position | -36.27 |
| Front principal point position | 7.61 |
| Rear principal point position | -2.40 |

Lens unit data

| Unit | Start surface | Focal length | Lens configuration length | Front principal point position | Rear principal point position |
|---|---|---|---|---|---|
| 1 | 1 | 32.59 | 9.71 | 23.19 | 43.94 |
| 2 | 7 | 6.70 | 9.86 | 5.50 | -1.28 |
| 3 | 15 | ∞ | 0.50 | 0.16 | -0.16 |

Single lens data

| Lens | Start surface | Focal length |
|---|---|---|
| 1 | 1 | -11.98 |
| 2 | 3 | -8.36 |
| 3 | 5 | 9.41 |
| 4 | 8 | -7.85 |
| 5 | 9 | 6.78 |
| 6 | 11 | 24.97 |
| 7 | 13 | 13.35 |
| 8 | 15 | 0.00 |

Numerical Example 2

Unit mm

Surface data

| Surface number | r | d | nd | vd | Effective diameter |
|---|---|---|---|---|---|
| 1 | 10.866 | 0.80 | 1.72916 | 54.7 | 10.84 |
| 2 | 4.803 | 1.11 | | | 8.12 |
| 3* | 5.693 | 0.80 | 1.55332 | 71.7 | 7.89 |
| 4* | 2.442 | 5.21 | | | 6.15 |
| 5 | 35.650 | 1.87 | 1.90366 | 31.3 | 4.91 |
| 6 | -10.719 | 2.79 | | | 4.49 |
| 7 (Stop) | ∞ | 1.98 | | | 3.71 |
| 8 | 29.399 | 0.80 | 1.92286 | 18.9 | 3.60 |
| 9 | 5.765 | 2.82 | 1.55332 | 71.7 | 3.67 |
| 10 | -9.831 | 0.15 | | | 5.18 |
| 11 | 24.395 | 1.69 | 1.51633 | 64.1 | 5.71 |
| 12 | -22.065 | 0.10 | | | 6.23 |
| 13 | 9.534 | 1.91 | 1.77250 | 49.6 | 6.66 |
| 14 | 132.428 | 3.99 | | | 6.55 |
| 15 | ∞ | 0.50 | 1.51633 | 64.1 | 10.00 |
| 16 | ∞ | 0.50 | | | 10.00 |
| Image plane | ∞ | | | | |

Aspheric surface data

Third surface

K = -9.49449e-001    A 4 = 1.49704e-003    A 6 = -1.99514e-004
A 8 = 1.10616e-005   A10 = -3.91278e-007   A12 = 6.43519e-009

Fourth surface

K = -9.17463e-001    A 4 = 4.58466e-003    A 6 = -4.11385e-004
A 8 = 3.09367e-005   A10 = -2.81263e-006   A12 = 9.70174e-008

Various types of data

| | |
|---|---|
| Focal length | 3.00 |
| F-number | 1.85 |
| Half angle of field | 48.01 |
| Image height | 3.00 |
| Lens total length | 26.87 |
| BF | 4.82 |
| Entrance pupil position | 5.07 |
| Exit pupil position | -29.37 |
| Front principal point position | 7.77 |
| Rear principal point position | -2.50 |

Lens unit data

| Unit | Start surface | Focal length | Lens configuration length | Front principal point position | Rear principal point position |
|---|---|---|---|---|---|
| 1 | 1 | 27.64 | 9.80 | 20.25 | 36.47 |
| 2 | 7 | 6.82 | 9.45 | 5.30 | -1.26 |
| 3 | 15 | ∞ | 0.50 | 0.16 | -0.16 |

Single lens data

| Lens | Start surface | Focal length |
|---|---|---|
| 1 | 1 | -12.50 |
| 2 | 3 | -8.47 |
| 3 | 5 | 9.30 |
| 4 | 8 | -7.90 |
| 5 | 9 | 7.02 |
| 6 | 11 | 22.72 |
| 7 | 13 | 13.21 |
| 8 | 15 | 0.00 |

Numerical Example 3

Unit mm

Surface data

| Surface number | r | d | nd | vd | Effective diameter |
|---|---|---|---|---|---|
| 1 | 9.748 | 0.80 | 1.77250 | 49.6 | 11.17 |
| 2 | 5.255 | 1.19 | | | 8.70 |
| 3* | 5.981 | 0.80 | 1.69350 | 53.2 | 8.43 |
| 4* | 2.585 | 5.11 | | | 6.48 |
| 5 | 28.630 | 1.70 | 2.00100 | 29.1 | 5.24 |
| 6 | −13.722 | 2.80 | | | 4.84 |
| 7 (Stop) | ∞ | 2.47 | | | 4.74 |
| 8 | 22.518 | 0.80 | 1.95906 | 17.5 | 4.65 |
| 9 | 6.223 | 2.66 | 1.49700 | 81.5 | 4.52 |
| 10 | −9.380 | 0.10 | | | 5.91 |
| 11 | 28.102 | 1.53 | 1.49700 | 81.5 | 6.58 |
| 12 | −23.071 | 0.05 | | | 7.06 |
| 13 | 8.429 | 2.14 | 1.77250 | 49.6 | 7.71 |
| 14 | 376.608 | 3.97 | | | 7.50 |
| 15 | ∞ | 0.50 | 1.51633 | 64.1 | 10.00 |
| 16 | ∞ | 0.50 | | | 10.00 |
| Image plane | ∞ | | | | |

Aspheric surface data

Third surface

K = −1.32242e+000  A 4 = 5.20488e−004  A 6 = −1.48931e−004
A 8 = 1.11905e−005  A10 = −4.18229e−007  A12 = 6.39074e−009

Fourth surface

K = −9.99466e−001  A 4 = 3.58264e−003  A 6 = −4.74680e−004
A 8 = 4.62609e−005  A10 = −2.61091e−006  A12 = 5.95543e−008

Various types of data

| | |
|---|---|
| Focal length | 3.00 |
| F-number | 1.44 |
| Half angle of field | 48.02 |
| Image height | 3.00 |
| Lens total length | 26.96 |
| BF | 4.80 |
| Entrance pupil position | 5.28 |
| Exit pupil position | −48.59 |
| Front principal point position | 8.10 |
| Rear principal point position | −2.50 |

Lens unit data

| Unit | Start surface | Focal length | Lens configuration length | Front principal point position | Rear principal point position |
|---|---|---|---|---|---|
| 1 | 1 | 45.11 | 9.61 | 29.49 | 55.08 |
| 2 | 7 | 6.53 | 9.75 | 5.67 | −1.30 |
| 3 | 15 | ∞ | 0.50 | 0.16 | −0.16 |

Single lens data

| Lens | Start surface | Focal length |
|---|---|---|
| 1 | 1 | −16.00 |
| 2 | 3 | −7.27 |
| 3 | 5 | 9.46 |
| 4 | 8 | −9.19 |
| 5 | 9 | 7.98 |
| 6 | 11 | 25.75 |
| 7 | 13 | 11.13 |
| 8 | 15 | 0.00 |

Numerical Example 4

Unit mm

Surface data

| Surface number | r | d | nd | vd | Effective diameter |
|---|---|---|---|---|---|
| 1 | 13.048 | 0.80 | 1.72916 | 54.7 | 13.50 |
| 2 | 5.418 | 2.52 | | | 9.58 |
| 3* | 6.750 | 0.80 | 1.55332 | 71.7 | 8.68 |
| 4* | 2.058 | 2.98 | | | 6.35 |
| 5 | 19.995 | 4.45 | 2.00069 | 25.5 | 5.88 |
| 6 | −18.928 | 2.24 | | | 4.22 |
| 7 (Stop) | ∞ | 1.51 | | | 2.82 |
| 8 | 12.487 | 2.34 | 1.55332 | 71.7 | 3.36 |
| 9 | −3.752 | 0.80 | 1.92286 | 18.9 | 4.24 |
| 10 | −8.215 | 0.10 | | | 4.99 |
| 11* | 29.915 | 2.89 | 1.58313 | 59.4 | 5.33 |
| 12* | −3.987 | 3.90 | | | 6.35 |
| 13 | ∞ | 0.50 | 1.51633 | 64.1 | 10.00 |
| 14 | ∞ | 0.50 | | | 10.00 |
| Image plane | ∞ | | | | |

Aspheric surface data

Third surface

K = −1.94531e+000  A 4 = −3.09257e−004  A 6 = −1.06411e−004
A 8 = 7.59464e−006  A10 = −2.37906e−007  A12 = 3.10972e−009

Fourth surface

K = −9.58691e−001  A 4 = 2.22709e−004  A 6 = −3.93665e−004
A 8 = 1.76771e−005  A10 = −3.48121e−007  A12 = 1.37046e−008

Eleventh surface

K = −1.10719e+002  A 4 = −2.05379e−003  A 6 = −8.73467e−005
A 8 = 1.10319e−006  A10 = −1.01202e−006  A12 = 6.39237e−009

Twelfth surface

K = −3.25120e+000  A 4 = −3.44869e−003  A 6 = 4.42330e−005
A 8 = 3.41073e−006  A10 = −9.32801e−007  A12 = 1.92139e−008

Various types of data

| | |
|---|---|
| Focal length | 2.00 |
| F-number | 1.85 |
| Half angle of field | 59.91 |
| Image height | 3.00 |
| Lens total length | 26.14 |
| BF | 4.73 |
| Entrance pupil position | 5.17 |
| Exit pupil position | −100.03 |
| Front principal point position | 7.13 |
| Rear principal point position | −1.50 |

Lens unit data

| Unit | Start surface | Focal length | Lens configuration length | Front principal point position | Rear principal point position |
|---|---|---|---|---|---|
| 1 | 1 | −16.62 | 11.54 | −4.98 | −23.87 |
| 2 | 7 | 5.11 | 7.63 | 4.85 | −1.00 |
| 3 | 13 | ∞ | 0.50 | 0.16 | −0.16 |

Single lens data

| Lens | Start surface | Focal length |
|---|---|---|
| 1 | 1 | −13.30 |
| 2 | 3 | −5.70 |
| 3 | 5 | 10.31 |
| 4 | 8 | 5.50 |
| 5 | 9 | −8.19 |

-continued

Unit mm

| 6 | 11 | 6.23 |
| 7 | 13 | 0.00 |

Numerical Example 5

Unit mm

Surface data

| Surface number | r | d | nd | vd | Effective diameter |
|---|---|---|---|---|---|
| 1 | 12.783 | 0.80 | 1.77250 | 49.6 | 13.50 |
| 2 | 5.451 | 2.19 | | | 9.64 |
| 3* | 6.519 | 0.80 | 1.55332 | 71.7 | 9.00 |
| 4* | 2.139 | 4.69 | | | 6.57 |
| 5 | 18.835 | 3.22 | 1.95906 | 17.5 | 5.10 |
| 6 | −44.018 | 1.89 | | | 3.80 |
| 7 (Stop) | ∞ | 0.71 | | | 4.06 |
| 8 | 8.237 | 3.40 | 1.43875 | 94.9 | 4.19 |
| 9 | −4.044 | 0.80 | 1.95906 | 17.5 | 4.37 |
| 10 | −7.680 | 0.53 | | | 5.10 |
| 11* | 9.309 | 3.13 | 1.55332 | 71.7 | 6.19 |
| 12* | −4.944 | 3.90 | | | 6.37 |
| 13 | ∞ | 0.50 | 1.51633 | 64.1 | 10.00 |
| 14 | ∞ | 0.50 | | | 10.00 |
| Image plane | ∞ | | | | |

Aspheric surface data

Third surface

K = −2.13664e+000    A 4 = −1.03063e−004    A 6 = −1.07352e−004
A 8 = 7.73577e−006   A10 = −2.29290e−007    A12 = 2.97657e−009
Fourth surface K = −9.60291e−001    A 4 = 2.24345e−004     A 6 = −3.85137e−004
A 8 = 2.07413e−005   A10 = −4.35811e−007    A12 = 2.73398e−008
Eleventh surface K = −2.31297e+000    A 4 = −3.55059e−004    A 6 = 2.80314e−005
A 8 = 6.45316e−006   A10 = −1.04930e−007    A12 = 1.40978e−009
Twelfth surface K = −4.62509e+000    A 4 = −1.10781e−003    A 6 = 1.05266e−004
A 8 = 4.66334e−006   A10 = −4.58068e−007    A12 = 4.11357e−008

Various types of data

| Focal length | 2.00 |
| F-number | 1.44 |
| Half angle of field | 59.91 |
| Image height | 3.00 |
| Lens total length | 26.88 |
| BF | 4.73 |
| Entrance pupil position | 5.06 |
| Exit pupil position | −83.03 |

-continued

Unit mm

| Front principal point position | 7.01 |
| Rear principal point position | −1.50 |

Lens unit data

| Unit | Start surface | Focal length | Lens configuration length | Front principal point position | Rear principal point position |
|---|---|---|---|---|---|
| 1 | 1 | −10.81 | 11.70 | −1.94 | −17.96 |
| 2 | 7 | 5.60 | 8.56 | 5.22 | −1.91 |
| 3 | 13 | ∞ | 0.50 | 0.16 | −0.16 |

Single lens data

| Lens | Start surface | Focal length |
|---|---|---|
| 1 | 1 | −12.92 |
| 2 | 3 | −6.15 |
| 3 | 5 | 14.11 |
| 4 | 8 | 6.75 |
| 5 | 9 | −9.98 |
| 6 | 11 | 6.33 |
| 7 | 13 | 0.00 |

Numerical Example 6

Unit mm

Surface data

| Surface number | r | d | nd | vd | Effective diameter |
|---|---|---|---|---|---|
| 1 | 22.075 | 1.20 | 1.58500 | 30.0 | 21.94 |
| 2 | 20.875 | 3.96 | | | 20.24 |
| 3 | 9.506 | 0.80 | 1.80400 | 46.6 | 10.60 |
| 4 | 4.605 | 1.06 | | | 7.94 |
| 5* | 5.351 | 0.80 | 1.58313 | 59.4 | 7.71 |
| 6* | 2.411 | 5.32 | | | 6.00 |
| 7 | 44.521 | 1.72 | 2.00069 | 25.5 | 4.45 |
| 8 | −11.719 | 2.42 | | | 4.02 |
| 9 (Stop) | ∞ | 1.87 | | | 3.67 |
| 10 | 23.066 | 0.80 | 1.95906 | 17.5 | 3.59 |
| 11 | 5.578 | 3.43 | 1.55332 | 71.7 | 3.49 |
| 12 | −8.933 | 0.15 | | | 5.40 |
| 13 | 20.695 | 1.63 | 1.49700 | 81.5 | 5.98 |
| 14 | −30.189 | 0.09 | | | 6.43 |
| 15 | 9.814 | 1.89 | 1.77250 | 49.6 | 6.81 |
| 16 | 184.683 | 3.99 | | | 6.69 |
| 17 | ∞ | 0.50 | 1.51633 | 64.1 | 10.00 |
| 18 | ∞ | 0.51 | | | 10.00 |
| Image plane | ∞ | | | | |

Aspheric surface data

Fifth surface

K = −1.04978e+000    A 4 = 1.81276e−003    A 6 = −2.22766e−004
A 8 = 1.40361e−005   A10 = −5.52816e−007   A12 = 1.00402e−008
Sixth surface K = −9.51025e−001    A 4 = 5.11349e−003    A 6 = −4.40018e−004
A 8 = 3.54637e−005   A10 = −3.15904e−006   A12 = 1.08491e−007

Various types of data

| Focal length | 2.93 |
| F-number | 1.85 |
| Half angle of field | 48.49 |

-continued

| Unit mm | |
|---|---|
| 17 | ∞ 0.50 1.51633 64.1 10.00 |
| 18 | ∞ 0.50 10.00 |
| Image plane | ∞ |

Aspheric surface data

Fifth surface

K = −9.49449e−001  A 4 = 1.49704e−003  A 6 = −1.99514e−004
A 8 = 1.10616e−005  A10 = −3.91278e−007  A12 = 6.43519e−009

Sixth surface

K = −9.17463e−001  A 4 = 4.58466e−003  A 6 = −4.11385e−004
A 8 = 3.09367e−005  A10 = −2.81263e−006  A12 = 9.70174e−008

Various types of data

| | |
|---|---|
| Focal length | 3.01 |
| F-number | 1.85 |
| Half angle of field | 47.86 |
| Image height | 3.00 |
| Lens total length | 47.14 |
| BF | 0.50 |
| d2 | 18.91 |
| d8 | 2.78 |
| d16 | 3.99 |
| d18 | 0.50 |
| Entrance pupil position | 25.13 |
| Exit pupil position | −29.37 |
| Front principal point position | 27.84 |
| Rear principal point position | −2.51 |

Lens unit data

| Unit | Start surface | Focal length | Lens configuration length | Front principal point position | Rear principal point position |
|---|---|---|---|---|---|
| 1 | 1 | −3002.24 | 1.20 | 37.07 | 35.87 |
| 2 | 3 | 27.64 | 9.80 | 20.25 | 36.47 |
| 3 | 9 | 6.82 | 9.45 | 5.30 | −1.26 |
| 4 | 17 | ∞ | 0.50 | 0.16 | −0.16 |

Single lens data

| Lens | Start surface | Focal length |
|---|---|---|
| 1 | 1 | −3002.24 |
| 2 | 3 | −12.50 |
| 3 | 5 | −8.47 |
| 4 | 7 | 9.30 |
| 5 | 10 | −7.90 |
| 6 | 11 | 7.02 |
| 7 | 13 | 22.72 |
| 8 | 15 | 13.21 |
| 9 | 17 | 0.00 |

Numerical Example 8

| Unit mm | | | | | |
|---|---|---|---|---|---|
| Surface data | | | | | |
| Surface number | r | d | nd | vd | Effective diameter |
| 1 | 19.290 | 1.20 | 1.58500 | 30.0 | 15.78 |
| 2 | 18.090 | 1.08 | | | 14.22 |
| 3 | 9.748 | 0.80 | 1.77250 | 49.6 | 11.13 |
| 4 | 5.255 | 1.19 | | | 8.68 |

---

-continued

| Unit mm | |
|---|---|
| Image height | 3.00 |
| Lens total length | 32.14 |
| BF | 0.51 |
| Entrance pupil position | 9.95 |
| Exit pupil position | −36.27 |
| Front principal point position | 12.65 |
| Rear principal point position | −2.42 |

Lens unit data

| Unit | Start surface | Focal length | Lens configuration length | Front principal point position | Rear principal point position |
|---|---|---|---|---|---|
| 1 | 1 | −1040.45 | 1.20 | 22.08 | 20.87 |
| 2 | 3 | 32.59 | 9.71 | 23.19 | 43.94 |
| 3 | 9 | 6.70 | 9.86 | 5.50 | −1.28 |
| 4 | 17 | ∞ | 0.50 | 0.16 | −0.16 |

Single lens data

| Lens | Start surface | Focal length |
|---|---|---|
| 1 | 1 | −1040.45 |
| 2 | 3 | −11.98 |
| 3 | 5 | −8.36 |
| 4 | 7 | 9.41 |
| 5 | 10 | −7.85 |
| 6 | 11 | 6.78 |
| 7 | 13 | 24.97 |
| 8 | 15 | 13.35 |
| 9 | 17 | 0.00 |

Numerical Example 7

| Unit mm | | | | | |
|---|---|---|---|---|---|
| Surface data | | | | | |
| Surface number | r | d | nd | vd | Effective diameter |
| 1 | 37.070 | 1.20 | 1.58500 | 30.0 | 43.47 |
| 2 | 35.870 | 18.91 | | | 41.77 |
| 3 | 10.866 | 0.80 | 1.72916 | 54.7 | 10.84 |
| 4 | 4.803 | 1.11 | | | 8.12 |
| 5* | 5.693 | 0.80 | 1.55332 | 71.7 | 7.88 |
| 6* | 2.442 | 5.21 | | | 6.14 |
| 7 | 35.650 | 1.87 | 1.90366 | 31.3 | 4.91 |
| 8 | −10.719 | 2.78 | | | 4.49 |
| 9 (Stop) | ∞ | 1.98 | | | 3.71 |
| 10 | 29.399 | 0.80 | 1.92286 | 18.9 | 3.60 |
| 11 | 5.765 | 2.82 | 1.55332 | 71.7 | 3.68 |
| 12 | −9.831 | 0.15 | | | 5.19 |
| 13 | 24.395 | 1.69 | 1.51633 | 64.1 | 5.72 |
| 14 | −22.065 | 0.10 | | | 6.24 |
| 15 | 9.534 | 1.91 | 1.77250 | 49.6 | 6.67 |
| 16 | 132.428 | 3.99 | | | 6.56 |

-continued

Unit mm

| | | | | | |
|---|---|---|---|---|---|
| 5* | 5.981 | 0.80 | 1.69350 | 53.2 | 8.39 |
| 6* | 2.585 | 5.11 | | | 6.45 |
| 7 | 28.630 | 1.70 | 2.00100 | 29.1 | 5.18 |
| 8 | −13.722 | 2.72 | | | 4.83 |
| 9 (Stop) | ∞ | 2.47 | | | 4.74 |
| 10 | 22.518 | 0.80 | 1.95906 | 17.5 | 4.66 |
| 11 | 6.223 | 2.66 | 1.49700 | 81.5 | 4.56 |
| 12 | −9.380 | 0.10 | | | 5.94 |
| 13 | 28.102 | 1.53 | 1.49700 | 81.5 | 6.61 |
| 14 | −23.071 | 0.05 | | | 7.09 |
| 15 | 8.429 | 2.14 | 1.77250 | 49.6 | 7.75 |
| 16 | 376.608 | 3.97 | | | 7.53 |
| 17 | ∞ | 0.50 | 1.51633 | 64.1 | 10.00 |
| 18 | ∞ | 0.51 | | | 10.00 |
| Image plane | ∞ | | | | |

Aspheric surface data

Fifth surface

K = −1.32242e+000   A 4 = 5.20488e−004   A 6 = −1.48931e−004
A 8 = 1.11905e−005   A10 = −4.18229e−007   A12 = 6.39074e−009

Sixth surface

K = −9.99466e−001   A 4 = 3.58264e−003   A 6 = −4.74680e−004
A 8 = 4.62609e−005   A10 = −2.61091e−006   A12 = 5.95543e−008

Various types of data

| | |
|---|---|
| Focal length | 3.04 |
| F-number | 1.44 |
| Half angle of field | 47.38 |
| Image height | 3.00 |
| Lens total length | 29.34 |
| BF | 0.51 |
| d2 | 1.08 |
| d8 | 2.72 |
| d16 | 3.97 |
| d18 | 0.51 |
| Entrance pupil position | 7.37 |
| Exit pupil position | −48.59 |
| Front principal point position | 10.22 |
| Rear principal point position | −2.53 |

Lens unit data

| Unit | Start surface | Focal length | Lens configuration length | Front principal point position | Rear principal point position |
|---|---|---|---|---|---|
| 1 | 1 | −787.89 | 1.20 | 19.29 | 18.09 |
| 2 | 3 | 45.11 | 9.61 | 29.49 | 55.08 |
| 3 | 9 | 6.53 | 9.75 | 5.67 | −1.30 |
| 4 | 17 | ∞ | 0.50 | 0.16 | −0.16 |

Single lens data

| Lens | Start surface | Focal length |
|---|---|---|
| 1 | 1 | −787.89 |
| 2 | 3 | −16.00 |
| 3 | 5 | −7.27 |
| 4 | 7 | 9.46 |
| 5 | 10 | −9.19 |
| 6 | 11 | 7.98 |
| 7 | 13 | 25.75 |
| 8 | 15 | 11.13 |
| 9 | 17 | 0.00 |

Numerical Example 9

Unit mm

Surface data

| Surface number | r | d | nd | vd | Effective diameter |
|---|---|---|---|---|---|
| 1 | 21.450 | 1.20 | 1.58500 | 30.0 | 24.10 |
| 2 | 20.250 | 3.97 | | | 22.19 |
| 3 | 13.048 | 0.80 | 1.72916 | 54.7 | 13.47 |
| 4 | 5.418 | 2.52 | | | 9.57 |
| 5* | 6.750 | 0.80 | 1.55332 | 71.7 | 8.65 |
| 6* | 2.058 | 2.98 | | | 6.33 |
| 7 | 19.995 | 4.45 | 2.00069 | 25.5 | 5.85 |
| 8 | −18.928 | 2.17 | | | 4.17 |
| 9 (Stop) | ∞ | 1.51 | | | 2.82 |
| 10 | 12.487 | 2.34 | 1.55332 | 71.7 | 3.40 |
| 11 | −3.752 | 0.80 | 1.92286 | 18.9 | 4.27 |
| 12 | −8.215 | 0.10 | | | 5.03 |
| 13* | 29.915 | 2.89 | 1.58313 | 59.4 | 5.37 |
| 14* | −3.987 | 3.90 | | | 6.39 |
| 15 | ∞ | 0.50 | 1.51633 | 64.1 | 10.00 |
| 16 | ∞ | 0.51 | | | 10.00 |
| Image plane | ∞ | | | | |

Aspheric surface data

Fifth surface

K = −1.94531e+000   A 4 = −3.09257e−004   A 6 = −1.06411e−004
A 8 = 7.59464e−006   A10 = −2.37906e−007   A12 = 3.10972e−009

Sixth surface

K = −9.58691e−001   A 4 = 2.22709e−004   A 6 = −3.93665e−004
A 8 = 1.76771e−005   A10 = −3.48121e−007   A12 = 1.37046e−008

Thirteenth surface

K = −1.10719e+002   A 4 = −2.05379e−003   A 6 = −8.73467e−005
A 8 = 1.10319e−006   A10 = −1.01202e−006   A12 = 6.39237e−009

Fourteenth surface

K = −3.25120e+000   A 4 = −3.44869e−003   A 6 = 4.42330e−005
A 8 = 3.41073e−006   A10 = −9.32801e−007   A12 = 1.92139e−008

Various types of data

| | |
|---|---|
| Focal length | 2.03 |
| F-number | 1.85 |
| Half angle of field | 59.23 |
| Image height | 3.00 |
| Lens total length | 31.42 |
| BF | 0.51 |
| d2 | 3.97 |
| d8 | 2.17 |
| d14 | 3.90 |
| d16 | 0.51 |
| Entrance pupil position | 10.21 |
| Exit pupil position | −100.03 |
| Front principal point position | 12.19 |
| Rear principal point position | −1.52 |

Lens unit data

| Unit | Start surface | Focal length | Lens configuration length | Front principal point position | Rear principal point position |
|---|---|---|---|---|---|
| 1 | 1 | −980.72 | 1.20 | 21.45 | 20.25 |
| 2 | 3 | −16.62 | 11.54 | −4.98 | −23.87 |

-continued

Unit mm

| | | | | | |
|---|---|---|---|---|---|
| 3 | 9 | 5.11 | 7.63 | 4.85 | −1.00 |
| 4 | 15 | ∞ | 0.50 | 0.16 | −0.16 |

Single lens data

| Lens | Start surface | Focal length |
|---|---|---|
| 1 | 1 | −980.72 |
| 2 | 3 | −13.30 |
| 3 | 5 | −5.70 |
| 4 | 7 | 10.31 |
| 5 | 10 | 5.50 |
| 6 | 11 | −8.19 |
| 7 | 13 | 6.23 |
| 8 | 15 | 0.00 |

Numerical Example 10

Unit mm

Surface data

| Surface number | r | d | nd | vd | Effective diameter |
|---|---|---|---|---|---|
| 1 | 22.190 | 1.20 | 1.58500 | 30.0 | 24.41 |
| 2 | 20.990 | 3.99 | | | 22.51 |
| 3 | 12.783 | 0.80 | 1.77250 | 49.6 | 13.46 |
| 4 | 5.451 | 2.19 | | | 9.63 |
| 5* | 6.519 | 0.80 | 1.55332 | 71.7 | 8.97 |
| 6* | 2.139 | 4.69 | | | 6.55 |
| 7 | 18.835 | 3.22 | 1.95906 | 17.5 | 5.07 |
| 8 | −44.018 | 1.81 | | | 3.81 |
| 9 (Stop) | ∞ | 0.71 | | | 4.06 |
| 10 | 8.237 | 3.40 | 1.43875 | 94.9 | 4.19 |
| 11 | −4.044 | 0.80 | 1.95906 | 17.5 | 4.43 |
| 12 | −7.680 | 0.53 | | | 5.16 |
| 13* | 9.309 | 3.13 | 1.55332 | 71.7 | 6.26 |
| 14* | −4.944 | 3.90 | | | 6.42 |
| 15 | ∞ | 0.50 | 1.51633 | 64.1 | 10.00 |
| 16 | ∞ | 0.51 | | | 10.00 |
| Image plane | ∞ | | | | |

Aspheric surface data

Fifth surface

K = −2.13664e+000   A 4 = −1.03063e−004   A 6 = −1.07352e−004
A 8 = 7.73577e−006   A10 = −2.29290e−007   A12 = 2.97657e−009

Sixth surface

K = −9.60291e−001   A 4 = 2.24345e−004   A 6 = −3.85137e−004
A 8 = 2.07413e−005   A10 = −4.35811e−007   A12 = 2.73398e−008

-continued

Unit mm

Thirteenth surface

K = −2.31297e+000   A 4 = −3.55059e−004   A 6 = 2.80314e−005
A 8 = 6.45316e−006   A10 = −1.04930e−007   A12 = 1.40978e−009

Fourteenth surface

K = −4.62509e+000   A 4 = −1.10781e−003   A 6 = 1.05266e−004
A 8 = 4.66334e−006   A10 = −4.58068e−007   A12 = 4.11357e−008

Various types of data

| | |
|---|---|
| Focal length | 2.03 |
| F-number | 1.44 |
| Half angle of field | 59.18 |
| Image height | 3.00 |
| Lens total length | 32.17 |
| BF | 0.51 |
| d2 | 3.99 |
| d8 | 1.81 |
| d14 | 3.90 |
| d16 | 0.51 |
| Entrance pupil position | 10.10 |
| Exit pupil position | −83.03 |
| Front principal point position | 12.08 |
| Rear principal point position | −1.52 |

Lens unit data

| Unit | Start surface | Focal length | Lens configuration length | Front principal point position | Rear principal point position |
|---|---|---|---|---|---|
| 1 | 1 | −1051.63 | 1.20 | 22.19 | 20.99 |
| 2 | 3 | −10.81 | 11.70 | −1.94 | −17.96 |
| 3 | 9 | 5.60 | 8.56 | 5.22 | −1.91 |
| 4 | 15 | ∞ | 0.50 | 0.16 | −0.16 |

Single lens data

| Lens | Start surface | Focal length |
|---|---|---|
| 1 | 1 | −1051.63 |
| 2 | 3 | −12.92 |
| 3 | 5 | −6.15 |
| 4 | 7 | 14.11 |
| 5 | 10 | 6.75 |
| 6 | 11 | −9.98 |
| 7 | 13 | 6.33 |
| 8 | 15 | 0.00 |

TABLE 1

Correspondence Values for Conditional Expressions in Respective Numerical Examples 1 to 5

| | Conditional Expression | Example 1 | 2 | 3 | 4 | 5 |
|---|---|---|---|---|---|---|
| | f | 2.90 | 3.00 | 3.00 | 2.00 | 2.00 |
| | f1 | 32.590 | 27.637 | 45.109 | −16.616 | −10.808 |
| | f2 | 6.697 | 6.821 | 6.534 | 5.110 | 5.602 |
| | ν1p | 25.46 | 31.32 | 29.13 | 25.46 | 17.47 |
| | ν1n | 52.98 | 63.18 | 51.40 | 63.18 | 60.64 |
| | ν2p | 67.61 | 61.81 | 70.89 | 65.53 | 83.31 |
| | ν2n | 17.47 | 18.90 | 17.47 | 18.90 | 17.47 |
| | Y | 3.00 | 3.00 | 3.00 | 3.00 | 3.00 |
| | ω | 48.98 | 48.01 | 48.02 | 59.91 | 59.91 |
| | Fno | 1.854 | 1.854 | 1.442 | 1.854 | 1.442 |
| | n1p | 2.00069 | 1.90366 | 2.00100 | 2.00069 | 1.95906 |
| | νcp | 71.68 | 71.68 | 81.54 | 71.68 | 94.93 |
| | νcn | 17.47 | 18.90 | 17.47 | 18.90 | 17.47 |
| | ncp | 1.55332 | 1.55332 | 1.49700 | 1.55332 | 1.43875 |
| | ncn | 1.95906 | 1.92286 | 1.95906 | 1.92286 | 1.95906 |
| (1) | f/f1 | 0.089 | 0.109 | 0.067 | −0.120 | −0.185 |
| (2) | f/f2 | 0.433 | 0.440 | 0.459 | 0.391 | 0.357 |
| (3) | ν1p/ν1n | 0.481 | 0.496 | 0.567 | 0.403 | 0.288 |
| (4) | ν2p/ν2n | 3.870 | 3.270 | 4.058 | 3.467 | 4.768 |
| (5) | Y/(f tan ω) | 0.900 | 0.900 | 0.900 | 0.869 | 0.869 |
| (6) | $f^2$/(Y Fno) | 1.512 | 1.618 | 2.080 | 0.719 | 0.925 |
| (7) | n1p | 2.001 | 1.904 | 2.001 | 2.001 | 1.959 |
| (8) | νcp/νcn | 4.103 | 3.793 | 4.667 | 3.793 | 5.434 |
| (9) | ncn − ncp | 0.406 | 0.370 | 0.462 | 0.370 | 0.520 |

TABLE 2

Correspondence Values for Conditional Expressions in Respective Numerical Embodiments 6 to 10

| | Conditional Expression | Numerical Example 6 | 7 | 8 | 9 | 10 |
|---|---|---|---|---|---|---|
| | f | 2.90 | 3.00 | 3.00 | 2.00 | 2.00 |
| | f1 | 32.59 | 27.64 | 45.11 | −16.62 | −10.81 |
| | D12 | 21.98 | 22.04 | 22.08 | 21.35 | 22.07 |
| | Ld | 3.96 | 18.91 | 1.08 | 3.97 | 3.99 |
| | fd | −1040.5 | −3002.3 | −787.9 | −980.7 | −1051.6 |
| | f2 | 6.697 | 6.821 | 6.534 | 5.110 | 5.602 |
| | φt | 1.580 | 1.620 | 2.120 | 1.100 | 1.400 |
| | φd | 21.938 | 43.466 | 15.776 | 24.096 | 24.411 |
| | R1 | 22.075 | 37.070 | 19.290 | 21.450 | 22.190 |
| | R2 | 20.875 | 35.870 | 18.090 | 20.250 | 20.990 |
| | Y | 3.00 | 3.00 | 3.00 | 3.00 | 3.00 |
| | Fno | 1.85 | 1.85 | 1.44 | 1.85 | 1.44 |
| (10) | Ld/D12 | 0.180 | 0.858 | 0.049 | 0.186 | 0.181 |
| (11) | f/fd | −0.0028 | −0.0010 | −0.0038 | −0.0020 | −0.0019 |
| (12) | f/f1 | 0.089 | 0.109 | 0.067 | −0.120 | −0.185 |
| (13) | sinθp | 0.452 | 0.449 | 0.466 | 0.520 | 0.468 |
| (14) | f/f2 | 0.433 | 0.440 | 0.459 | 0.391 | 0.357 |
| (15) | φt/φd | 0.072 | 0.037 | 0.134 | 0.046 | 0.057 |
| (16) | (R1 + R2)/(R1 − R2) | 35.792 | 60.783 | 31.150 | 34.750 | 35.983 |
| (17) | $f^2$/(Y × Fno) | 1.52 | 1.62 | 2.08 | 0.72 | 0.93 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-072744, filed Mar. 29, 2013, and Japanese Patent Application No. 2013-072745, filed Mar. 29, 2013 which are hereby incorporated by reference herein in their entirety.

What is claimed is:

1. A lens apparatus, comprising an optical system that comprises, in order from an object side to an image side: a first lens unit; an aperture stop; and a second lens unit having a positive refractive power, wherein the first lens unit comprises, in order from the object side to the image side, a first negative lens, a second negative lens, and a positive lens, and the second lens unit comprises at least one negative lens and at least two positive lenses, the first negative lens and the second negative lens of the first lens unit are meniscus lenses having a surface convex toward the object side, the second negative lens of the first lens unit has at least one aspheric surface, and $-0.25 < f/f1 < 0.20$, $0.33 < f/f2 < 0.60$, $0.20 < \nu1p/\nu1n < 0.70$ and $3.00 < \nu2p/\nu2n < 6.00$ are satisfied where f is a focal length of the optical system, f1 and f2 are focal lengths of the first lens unit and second lens unit, respectively, $\nu1p$ and $\nu1n$ are mean values of Abbe constants of the positive lens and the negative lenses of the first lens unit, respectively, and $\nu2p$ and $\nu2n$ are mean values of Abbe constants of the positive lenses and the negative lenses of the second lens unit, respectively.

2. The lens apparatus according to claim 1, wherein $1.90 < n1p < 2.30$ is satisfied where n1p is a refractive index of the positive lens of the first lens unit for d-line.

3. The lens apparatus according to claim 1, wherein the second lens unit comprises a cemented lens including a negative lens and a positive lens, and $3.00 < \nu cp/\nu cn < 6.00$ is satisfied where $\nu cn$ and $\nu cp$ are Abbe constants of the negative lens and the positive lens of the cemented lens, respectively.

4. The lens apparatus according to claim 1, wherein the second lens unit comprises a cemented lens including a negative lens and a positive lens, and $0.30 < ncn-ncp < 0.60$ is satisfied where ncn and ncp are refractive indices for d-line of the negative lens and the positive lens of the cemented lens, respectively.

5. The lens apparatus according to claim 1, wherein the second lens unit comprises, in order from the object side to the image side: a cemented lens including a negative lens and a positive lens; a positive lens; and a positive lens.

6. The lens apparatus according to claim 1, wherein the second lens unit comprises, in order from the object side to the image side: a cemented lens including a positive lens and a negative lens; and a positive lens, wherein the positive lens disposed on a most image side has an aspheric surface.

7. A lens apparatus, comprising:
an optical system that comprises, in order from an object side to an image side, a detachable concentric-shaped dome cover that is detachable from the lens apparatus, a first lens unit, an aperture stop, and a second lens unit having a positive refractive power
wherein an air interval between the first lens unit and the second lens unit is variable, and
wherein $0.02 < Ld/D12 < 1.00$, $-0.0060 < f/fd < -0.0009$, and $-0.25 < f/f1 < 0.20$ are satisfied where Ld is an air interval on an optical axis of an image-side surface of the dome cover and a most object-side surface of the first lens unit in a case where the dome cover is mounted, D12 is a thickness on the optical axis from the most object-side surface of the first lens unit to a most image-side surface of the second lens unit in the case where the dome cover is mounted, f is a focal length of the optical system, fd is a focal length of the dome cover, and f1 is a focal length of the first lens unit.

8. The lens apparatus according to claim 7, wherein $0.33 < f/f2 < 0.60$ is satisfied where f2 is a focal length of the second lens unit.

9. The lens apparatus according to claim 7, wherein $20.0 < (R1+R2)/(R1-R2) < 80.0$ is satisfied where R1 is a curvature radius of an object-side surface of the dome cover, and R2 is a curvature radius of the image-side surface of the dome cover.

10. An image pickup apparatus, comprising:
a lens apparatus comprising:
an optical system that comprises, in order from an object side to an image side, a detachable concentric-shaped dome cover that is detachable from the lens apparatus, a first lens unit, an aperture stop, and a second lens unit having a positive refractive power,
wherein an air interval between the first lens unit and the second lens unit is variable, and
wherein $0.02 < Ld/D12 < 1.00$, $-0.0060 < f/fd < -0.0009$, and $-0.25 < f/f1 < 0.20$ are satisfied where Ld is an air interval on an optical axis of an image-side surface of the dome cover and a most object-side surface of the first lens unit in a case where the dome cover is mounted, D12 is a thickness on the optical axis from the most object-side surface of the first lens unit to a most image-side surface of the second lens unit in the case where the dome cover is mounted, f is a focal length of the optical system, fd is a focal length of the dome cover, and f1 is a focal length of the first lens unit; and
an image pickup element that receives subject light from the lens apparatus, wherein $0.30 < |\sin \theta p| < 0.70$ is satisfied where $\theta p$ is an angle between an off-axial principal ray and the optical axis at an intersection between the principal ray and the optical axis, the principal ray corresponding to a maximum image height in subject light received by the image pickup element.

11. The image pickup apparatus according to claim 10, wherein $0.01 < \phi t/\phi d < 0.18$ is satisfied where $\phi t$ is an entrance pupil diameter of the optical system for an infinity object in the case where the dome cover is mounted, and $\phi d/2$ is a maximum ray height of an object-side surface of the dome cover.

12. The image pickup apparatus according to claim 10, wherein the optical system satisfies $0.50 < f^2/(Y \times Fno) < 2.50$ (unit mm)

where Y is a maximum image height, and Fno is an f-number in an infinity focusing state.

13. An image pickup apparatus, comprising:
a lens apparatus comprising an optical system that comprises, in order from an object side to an image side: a first lens unit; an aperture stop; and a second lens unit having a positive refractive power, wherein the first lens unit comprises, in order from the object side to the image side, a first negative lens, a second negative lens, and a positive lens, the second lens unit comprises at least one negative lens and at least two positive lenses, the first negative lens and the second negative lens of the first lens unit are meniscus lenses having a surface convex toward the object side, the second negative lens of the first lens unit has at least one aspheric surface, and $-0.25 < f/f1 < 0.20$, $0.33 < f/f2 < 0.60$, $0.20 < v1p/v1n < 0.70$, and $3.00 < v2p/v2n < 6.00$ are satisfied where f is a focal length of the optical system, f1 and f2 are focal lengths of the first lens unit and second lens unit, respectively, v1p and v1n are mean values of Abbe constants of the positive lens and the negative lenses of the first lens unit, respectively, and v2p and v2n are mean values of Abbe constants of the positive lenses and the negative lenses of the second lens unit, respectively; and an image pickup element that receives subject light from the lens apparatus, wherein $0.7 < Y/\{f \times \tan(\omega)\} < 1.0$ is satisfied where Y is a maximum image height on the image pickup element, and ω is a half angle of field at the maximum image height.

14. An image pickup apparatus, comprising:

a lens apparatus comprising an optical system that comprises, in order from an object side to an image side: a first lens unit; an aperture stop; and a second lens unit having a positive refractive power, wherein the first lens unit comprises, in order from the object side to the image side, a first negative lens, a second negative lens, and a positive lens, the second lens unit comprises at least one negative lens and at least two positive lenses the first negative lens and the second negative lens of the first lens unit are meniscus lenses having a surface convex toward the object side, the second negative lens of the first lens unit has at least one aspheric surface, and $-0.25 < f/f1 < 0.20$, $0.33 < f/f2 < 0.60$, $0.20 < v1p/v1n < 0.70$, and $3.00 < v2p/v2n < 6.00$ are satisfied where f is a focal length of the optical system, f1 and f2 are focal lengths of the first lens unit and second lens unit, respectively, v1p and v1n are mean values of Abbe constants of the positive lens and the negative lenses of the first lens unit, respectively, and v2p and v2n are mean values of Abbe constants of the positive lenses and the negative lenses of the second lens unit, respectively; and an image pickup element that receives subject light from the lens apparatus, wherein $0.50 < f^2/(Y \times Fno) < 2.50$ (unit mm)

is satisfied where Y is a maximum image height on the image pickup element, and Fno is an f-number in an infinity state.

* * * * *